US012699487B2

(12) United States Patent
Hollands et al.

(10) Patent No.: US 12,699,487 B2
(45) Date of Patent: Aug. 4, 2026

(54) TOUCH SENSING FOR MULTI-SURFACE TOUCH-SENSITIVE DEVICE

(71) Applicant: Apple Inc., Cupertino, CA (US)

(72) Inventors: Matthew D. Hollands, Cambridge (GB); James E. Pedder, Oxon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/020,519

(22) Filed: Jan. 14, 2025

(65) Prior Publication Data

US 2025/0306720 A1    Oct. 2, 2025

Related U.S. Application Data

(60) Provisional application No. 63/572,101, filed on Mar. 29, 2024.

(51) Int. Cl.
*G06F 3/044* (2006.01)

(52) U.S. Cl.
CPC .......... *G06F 3/0443* (2019.05); *G06F 3/0445* (2019.05); *G06F 3/0446* (2019.05); *G06F 2203/04104* (2013.01)

(58) Field of Classification Search
CPC ...... G06F 3/041; G06F 3/0448; G06F 3/0445; G06F 3/04164; G06F 3/0443; G06F 3/0446; G06F 2203/04104
See application file for complete search history.

(56) References Cited

U.S. PATENT DOCUMENTS

| | | |
|---|---|---|
| 8,330,727 B2 | 12/2012 | Westerman et al. |
| 9,367,146 B2 | 6/2016 | Piot et al. |
| 10,198,085 B2 | 2/2019 | Bezinge et al. |
| 10,671,222 B2 | 6/2020 | Kuboyama et al. |
| 10,852,876 B2 | 12/2020 | Jamshidi-Roudbari et al. |

(Continued)

FOREIGN PATENT DOCUMENTS

| | | |
|---|---|---|
| JP | 7087022 B2 | 6/2022 |
| KR | 10-2013-0007311 A | 1/2013 |
| WO | 2022/246399 A1 | 11/2022 |

OTHER PUBLICATIONS

Chub, Alex, "Samsung Galaxy Watch5 Pro and Watch5 Review: Plus Battery Life, Minus Physical Bezel", Available online at: <https://gagadget.com/en/175657-samsung-galaxy-watch5-pro-and-watch5-review-plus-battery-life-minus-physical-bezel/>, [retrieved on Oct. 25, 2022], Oct. 12, 2022, 15 pages.

(Continued)

*Primary Examiner* — Deeprose Subedi
(74) *Attorney, Agent, or Firm* — Kubota & Basol LLP

(57)    ABSTRACT

An electronic device includes multiple, non-parallel touch-sensitive surfaces for touch input. In some examples, the electronic device includes a housing comprising a first surface, a second surface, and a third surface. The second surface is arranged between and non-parallel to the first surface and the third surface. In some examples, a plurality of first sense electrode segments is disposed on the first surface and a plurality of second sense electrode segments is disposed on the second surface. In some examples, a plurality of drive electrodes separates one or more pairs of the first sense electrode segments and one or more pairs of the second sense electrode segments. In some examples, at least one drive electrode of the plurality of drive electrodes is disposed on the first surface, the second surface, and the third surface.

20 Claims, 18 Drawing Sheets

(56) References Cited

U.S. PATENT DOCUMENTS

| 11,650,703 | B2 | 5/2023 | Kono et al. | |
| 2012/0182233 | A1 | 7/2012 | Kim | |
| 2013/0154999 | A1 | 6/2013 | Guard | |
| 2014/0146005 | A1 | 5/2014 | Hong et al. | |
| 2015/0103021 | A1 | 4/2015 | Lim et al. | |
| 2015/0160760 | A1 * | 6/2015 | Sato ..................... | G06F 1/1626 |
| | | | | 345/174 |
| 2016/0231857 | A1 | 8/2016 | Kano et al. | |
| 2016/0291781 | A1 | 10/2016 | He et al. | |
| 2017/0090614 | A1 | 3/2017 | Kuboyama et al. | |
| 2017/0185180 | A1 | 6/2017 | Chae | |
| 2018/0101711 | A1 | 4/2018 | D'Souza et al. | |
| 2019/0073077 | A1 | 3/2019 | Kim et al. | |
| 2020/0210027 | A1 | 7/2020 | Ma et al. | |
| 2020/0266246 | A1 | 8/2020 | Bok et al. | |
| 2025/0265789 | A1 | 8/2025 | Hollands et al. | |

OTHER PUBLICATIONS

International Search Report received for PCT Patent Application No. PCT/US2025/016086, mailed on May 22, 2025, 5 pages.
DJI, "DJI RS 3 PRO User Manual", Jun. 29, 2022, Retrieved from the Internet: URL: https://dl.djicdn.com/downloads/DJI_RS_3_Pro/ DJI_RS_3_Pro_User_Manual_v1.0_EN.pdf, 38 pages.

* cited by examiner

MOBILE
TELEPHONE
136

TOUCH
SCREEN
124

TOUCH
SCREEN
126

MEDIA
PLAYER
140

TOUCH
SCREEN
128

PERSONAL
COMPUTER
144

TOUCH SENSOR
PANEL
134

TOUCH
SCREEN
130

TABLET
COMPUTER
148

TOUCH
SCREEN
132

WEARABALE
DEVICE
150

STRAP
152

TOUCH SENSOR
PANEL
138

REMOTE CONTROL
DEVICE
154

TOUCH SENSING FOR MULTI-SURFACE TOUCH-SENSITIVE DEVICE

CROSS-REFERENCE TO RELATED APPLICATIONS

This application claims the benefit of U.S. Provisional Application No. 63/572,101, filed Mar. 29, 2024, the entire disclosure of which is herein incorporated by reference for all purposes.

FIELD OF THE DISCLOSURE

This relates generally to electronic devices and methods for detecting touch inputs to a touch-sensitive device including a plurality of touch-sensitive surfaces.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch-sensing systems, a physical touch on the display is not needed to detect a touch. For example, in some capacitive-type touch-sensing systems, fringing electrical fields used to detect touch can extend beyond the surface of the display, and objects approaching near the surface may be detected near the surface without actually touching the surface. In some examples, a touch screen or touch sensor panel can detect touches by or proximity of multiple objects (e.g., one or more fingers or other touch objects), and such interactions can be used to perform various inputs using multiple objects. Such a touch screen or touch sensor panel may be referred to as a "multi-touch" touch screen or touch sensor panel, and may accept "multi-touch gestures" as inputs.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch-sensing circuitry into a display pixel stackup (i.e., the stacked material layers forming the display pixels).

SUMMARY OF THE DISCLOSURE

Some examples of the disclosure relate to an electronic device that includes a plurality of touch-sensitive surfaces. In some examples, the electronic device includes a housing comprising a first surface, a second surface, and a third surface. In some examples, the second surface is disposed between and non-parallel to the first surface and the third surface. In some examples, the electronic device includes a plurality of first sense electrode segments disposed on the first surface, and a plurality of second sense electrode segments disposed on the second surface. In some examples, one or more first sense electrode segments of the plurality of first sense electrode segments are coupled to form one or more first sense electrodes on the first surface, and one or more second sense electrode segments of the plurality of second sense electrode segments are coupled to form one or more second sense electrodes on the second surface. In some examples, the electronic device includes a plurality of drive electrodes including one or more drive electrodes that separate one or more pairs of first sense electrode segments and one or more pairs of second sense electrode segments. In some examples, at least one drive electrode of the plurality of drive electrodes is disposed on the first surface, the second surface, and the third surface.

In some examples, the housing comprises a fourth surface that is disposed between and non-parallel to the first surface and the third surface. For example, the fourth surface is disposed opposite from the second surface. In some examples, a plurality of third sense electrode segments is disposed on the third surface, and one or more drive electrodes of the plurality of drive electrodes separate one or more pairs of third sense electrode segments. In some examples, the at least one drive electrode of the plurality of drive electrodes is further disposed on the fourth surface.

Some examples of the disclosure relate to a touch sensor panel. For example, the touch sensor panel is of an electronic device that includes a plurality of touch-sensitive surfaces. In some examples, the touch sensor panel includes a first section, a second section, and a third section. In some examples, the second section is disposed between and non-parallel to the first section and the third section. In some examples, the touch sensor panel includes a plurality of first sense electrode segments disposed in the first section, and a plurality of second sense electrode segments disposed in the second section. In some examples, one or more first sense electrode segments of the plurality of first sense electrode segments are coupled to form one or more first sense electrodes on the first section, and one or more second sense electrode segments of the plurality of second sense electrode segments are coupled to form one or more second sense electrodes on the second section. In some examples, the touch sensor panel includes a plurality of drive electrodes including one or more drive electrodes that separate one or more pairs of first sense electrode segments and one or more pairs of second sense electrode segments. In some examples, at least one drive electrode of the plurality of drive electrodes is disposed in the first section, the second section, and the third section.

Examples of the disclosure enable contacts to be detected by an electronic device on multiple touch-sensitive surfaces, including non-parallel touch-sensitive surfaces. For example, the electronic device is configured to perform a first operation in response to a contact detected on a first surface, and a second operation, different from the first operation, in response to a contact detected on a second surface that is non-parallel to the first surface.

DETAILED DESCRIPTION

Figures 1A, 1B, 1C, 1D, 1E:
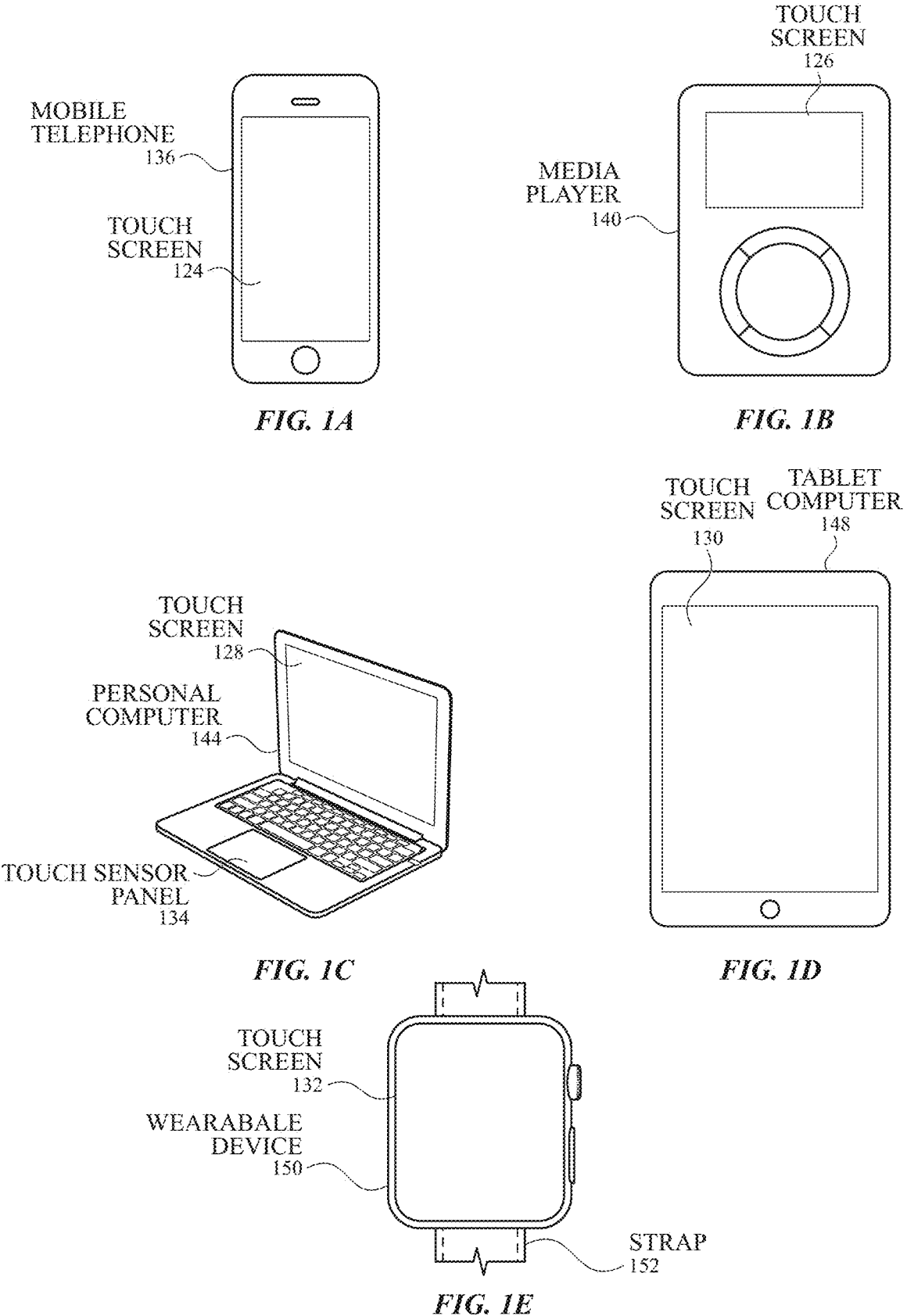
FIGS. 1A-1H illustrate touch-sensing devices or systems that can include a touch screen or touch sensor panel according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some examples of the disclosure relate to an electronic device that includes a plurality of touch-sensitive surfaces. In some examples, the electronic device includes a housing comprising a first surface, a second surface, and a third surface. In some examples, the second surface is disposed between and non-parallel to the first surface and the third surface. In some examples, the electronic device includes a plurality of first sense electrode segments disposed on the first surface, and a plurality of second sense electrode segments disposed on the second surface. In some examples, one or more first sense electrode segments of the plurality of first sense electrode segments are coupled to form one or more first sense electrodes on the first surface, and one or more second sense electrode segments of the plurality of second sense electrode segments are coupled to form one or more second sense electrodes on the second surface. In some examples, the electronic device includes a plurality of drive electrodes including one or more drive electrodes that separate one or more pairs of first sense electrode segments and one or more pairs of second sense electrode segments. In some examples, at least one drive electrode of the plurality of drive electrodes is disposed on the first surface, the second surface, and the third surface.

In some examples, the housing comprises a fourth surface that is disposed between and non-parallel to the first surface and the third surface. For example, the fourth surface is disposed opposite from the second surface. In some examples, a plurality of third sense electrode segments is disposed on the third surface, and one or more drive electrodes of the plurality of drive electrodes separate one or more pairs of third sense electrode segments. In some examples, the at least one drive electrode of the plurality of drive electrodes is further disposed on the fourth surface.

Some examples of the disclosure relate to a touch sensor panel. For example, the touch sensor panel is of an electronic device that includes a plurality of touch-sensitive surfaces. In some examples, the touch sensor panel includes a first section, a second section, and a third section. In some examples, the second section is disposed between and non-parallel to the first section and the third section. In some examples, the touch sensor panel includes a plurality of first sense electrode segments disposed in the first section, and a plurality of second sense electrode segments disposed in the second section. In some examples, one or more first sense electrode segments of the plurality of first sense electrode segments are coupled to form one or more first sense electrodes on the first section, and one or more second sense electrode segments of the plurality of second sense electrode segments are coupled to form one or more second sense electrodes on the second section. In some examples, the touch sensor panel includes a plurality of drive electrodes including one or more drive electrodes that separate one or more pairs of first sense electrode segments and one or more pairs of second sense electrode segments. In some examples, at least one drive electrode of the plurality of drive electrodes is disposed in the first section, the second section, and the third section.

Examples of the disclosure enable contacts to be detected by an electronic device on multiple touch-sensitive surfaces, including non-parallel touch-sensitive surfaces. For example, the electronic device is configured to perform a first operation in response to a contact detected on a first surface, and a second operation, different from the first operation, in response to a contact detected on a second surface that is non-parallel to the first surface.

Figure 1F:
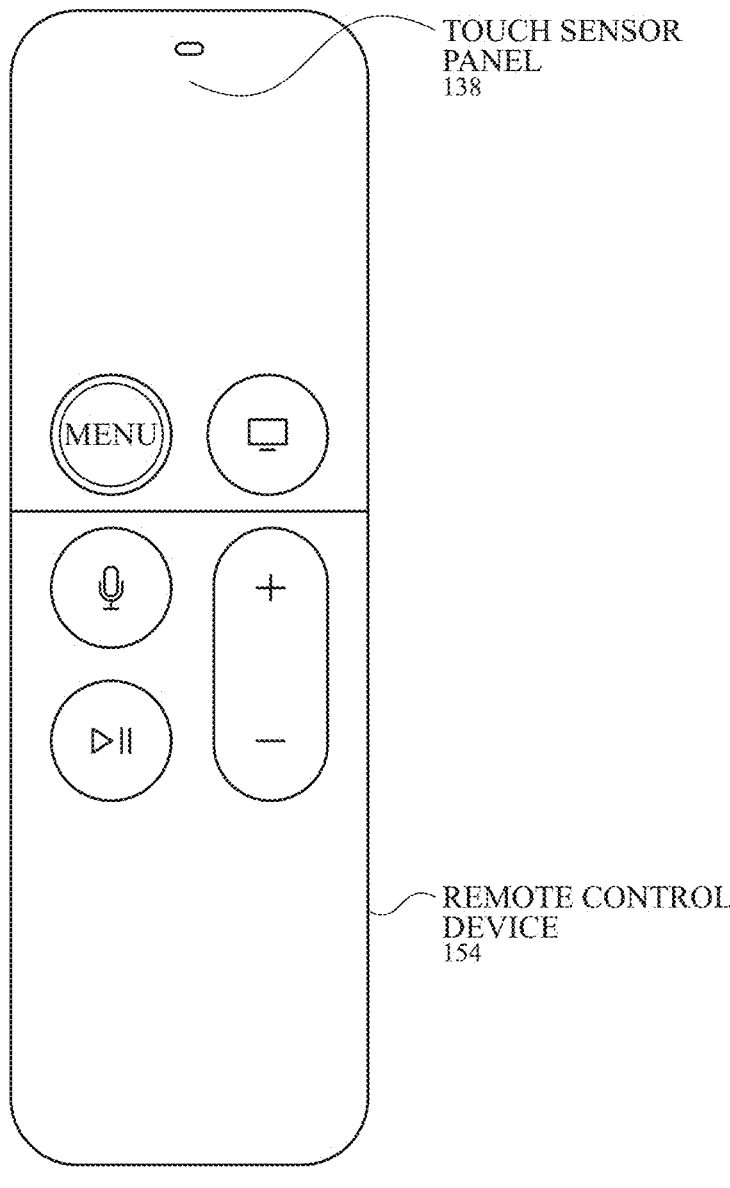
Figures 1G, 1H:
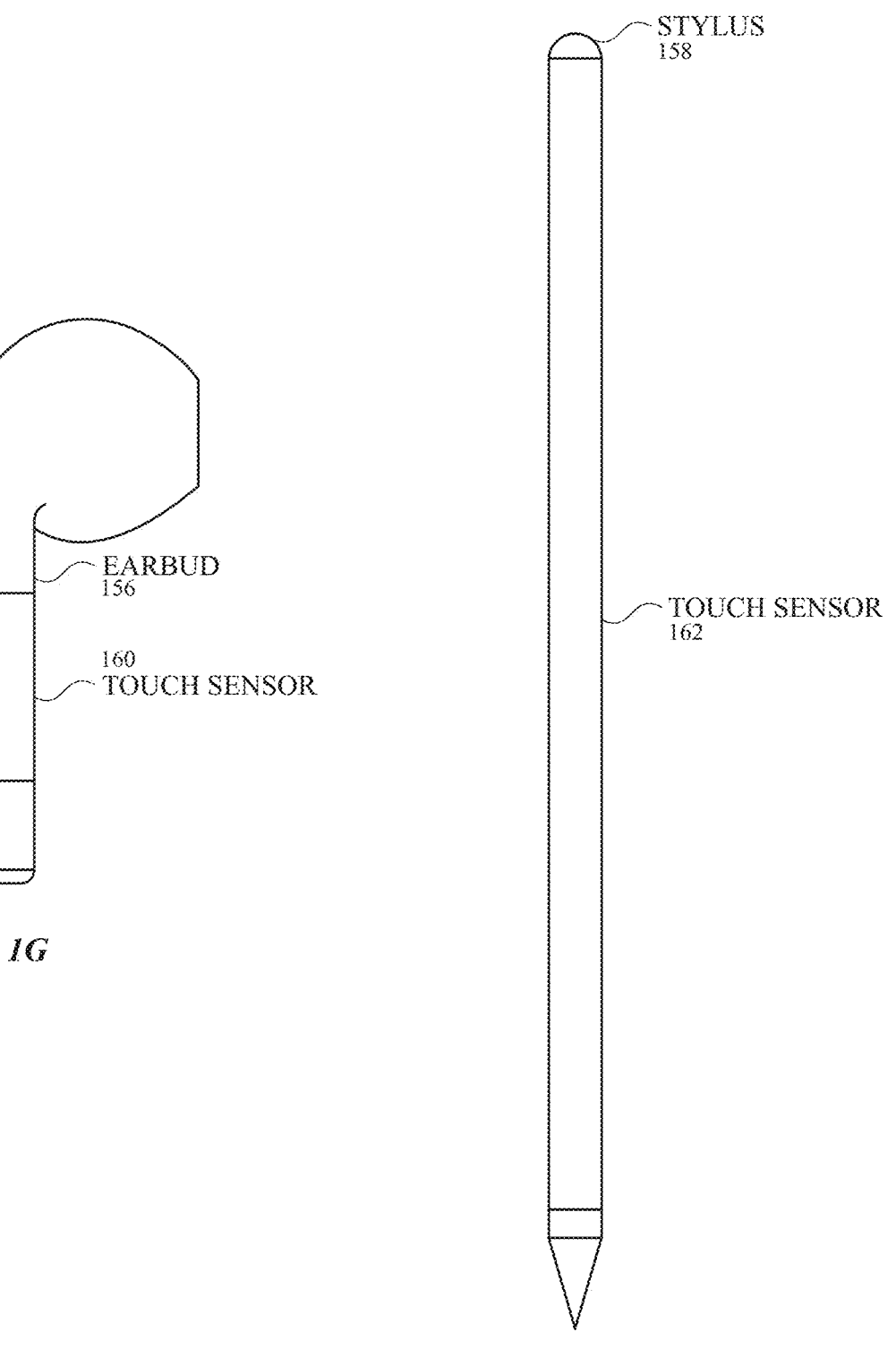

FIGS. 1A-1H illustrate touch-sensing devices or systems that can include a touch screen or touch sensor panel according to examples of the disclosure. FIG. 1A illustrates an example mobile telephone 136 that can include a touch screen 124 according to examples of the disclosure. FIG. 1B illustrates an example digital media player 140 that can include a touch screen 126 and/or a touch sensor panel according to examples of the disclosure. FIG. 1C illustrates an example personal computer 144 that can include a touch screen 128 and a track pad with a touch sensor panel according to examples of the disclosure. FIG. 1D illustrates an example tablet computing device 148 that can include a touch screen 130 according to examples of the disclosure. FIG. 1E illustrates an example wearable device 150 that includes a touch screen 132 and can be attached to a user using a strap 152 according to examples of the disclosure. In some examples, the wearable device is worn on the head, such as a head-mounted display (HMD), which is fastened to the head using a strap or arms. FIG. 1F illustrates an example remote control device 154 that includes a touch sensor panel 138 according to examples of the disclosure. FIG. 1G illustrates an example earbud 156 that includes a touch sensor 160 according to examples of the disclosure. FIG. 1H illustrates an example stylus 158 that includes a touch sensor 162 according to examples of the disclosure. It is understood that a touch screen (which can include a touch sensor panel) or a touch sensor panel (without a touch screen, such as in a trackpad) can be implemented in other devices as well, and that the example systems of FIGS. 1A-1H can further include touch sensor panels on surfaces not shown in the figures.

In some examples, touch screens 124, 126, 128, 130 and 132, touch sensor panel 138, and touch sensors 160 and 162 can detect touch and/or proximity activity based on self-capacitance. A self-capacitance based touch system can include a matrix of small, individual plates of conductive material or groups of individual plates of conductive material forming larger conductive regions that can be referred to as touch electrodes or as touch-node electrodes (e.g., as described below with reference to FIG. 4B). For example, a touch screen or touch sensor panel can include a plurality of individual touch electrodes, each touch electrode identifying or representing a unique location (e.g., a touch node) on the touch screen or touch sensor panel at which touch or proximity is to be sensed, and each touch-node electrode being electrically isolated from the other touch-node electrodes in the touch screen/panel. Such a touch screen/panel can be referred to as a pixelated self-capacitance touch screen/panel, though it is understood that in some examples, the touch-node electrodes on the touch screen/panel can be used to perform scans other than self-capacitance scans on the touch screen/panel (e.g., mutual capacitance scans). During operation, a touch-node electrode can be stimulated with an alternating current (AC) waveform, and the self-capacitance to ground of the touch-node electrode can be measured. As an object approaches the touch-node electrode, the self-capacitance to ground of the touch-node electrode can change (e.g., increase). This change in the self-capacitance of the touch-node electrode can be detected and measured by the touch-sensing system to determine the positions of multiple objects when they touch, or come in proximity to, the touch screen/panel. In some examples, the touch-node electrodes of a self-capacitance based touch system can be formed from rows and columns of conductive material, and changes in the self-capacitance to ground of the rows and columns can be detected, similar to above. In some examples, a touch screen/panel can be multi-touch, single touch, projection scan, full-imaging multi-touch, capacitive touch, etc. As described herein, a plurality of auxiliary electrodes can be used improve accuracy of touch detection by the aforementioned touch sensor panels/touch screens.

In some examples, touch screens 124, 126, 128, 130 and 132, touch sensor panel 138 and touch sensors 160 and 162 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch-sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch screens 124, 126, 128, 130 and 132, touch sensor panel 138, and touch sensors 160 and 162 can be based on mutual capacitance and/or self-capacitance. The electrodes can be arranged as a matrix of small, individual plates of conductive material (e.g., as in touch-node electrodes 408 in touch screen/panel 402 in FIG. 4B) or as drive lines and sense lines (e.g., as in row touch electrodes 404 and column touch electrodes 406 in touch screen/panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
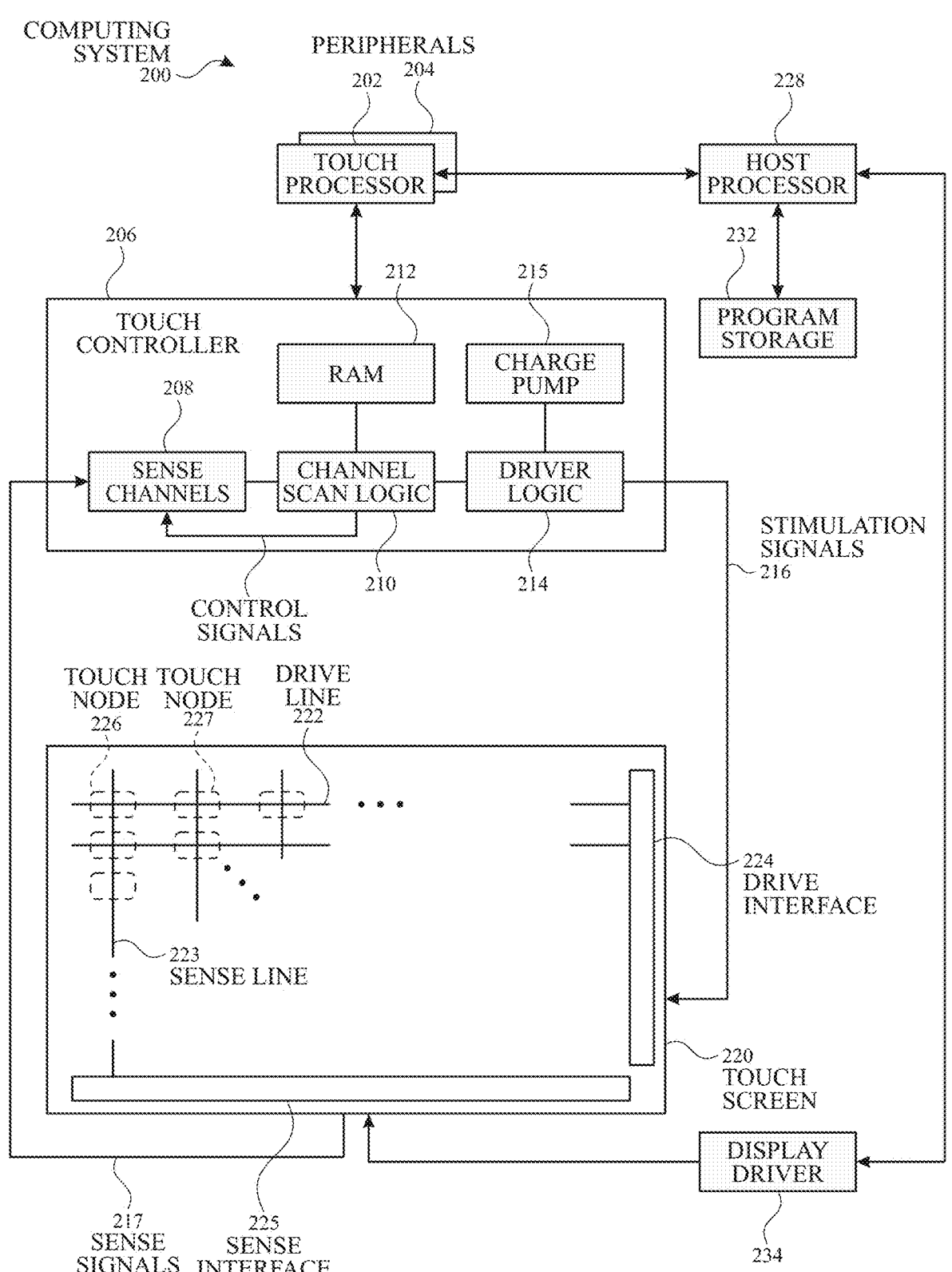
FIG. 2 illustrates a computing system including a touch screen according to examples of the disclosure.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch-sensing system including one or more touch processors 202, peripherals 204, a touch controller 206, and touch-sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch-sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself. The example computing system 200 of FIG. 2 can be configured to implement and perform any of the scans and comparisons described below.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI) and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described in this disclosure can be performed by firmware stored in memory (e.g., one of the peripherals 204 in FIG. 2) and executed by touch processor 202 or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch-sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch-sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch node in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
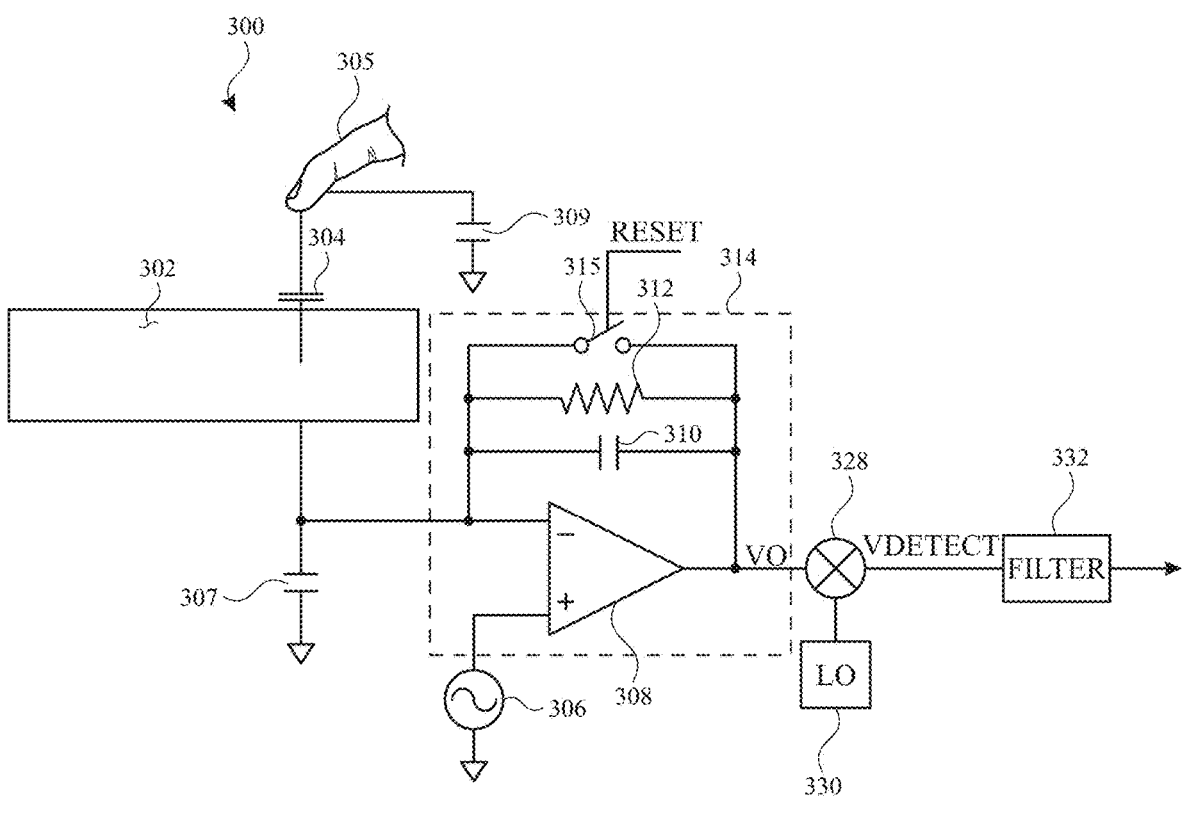
FIG. 3A illustrates a touch sensor circuit corresponding to a self-capacitance measurement of a touch-node electrode and sensing circuit according to examples of the disclosure.

FIG. 3A illustrates an exemplary touch sensor circuit 300 corresponding to a self-capacitance measurement of a touch-node electrode 302 and sensing circuit 314 (e.g., corresponding to a sense channel 208) according to examples of the disclosure. Touch-node electrode 302 can correspond to a touch electrode 404 or 406 of touch screen/panel 400 or a touch-node electrode 408 of touch screen/panel 402. Touch-node electrode 302 can have an inherent self-capacitance to ground associated with it, and also an additional self-capacitance to ground that is formed when an object, such as finger 305, is in proximity to or touching the electrode. The total self-capacitance to ground of touch-node electrode 302 can be illustrated as capacitance 304. Touch-node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch-node electrode 302 can be coupled to the inverting input (–) of operational amplifier 308. An AC voltage source (Vac) can be coupled to the non-inverting input (+) of operational amplifier 308. Touch sensor circuit 300 can be configured to sense changes (e.g., increases) in the total self-capacitance 304 of the touch-node electrode 302 induced by a finger or object either touching or in proximity to the touch screen/panel. Output 320 can be used by a processor to determine the presence of a proximity or touch event, or the output can be inputted into a discrete logic network to determine the presence of a proximity or touch event.

Figure 3B:
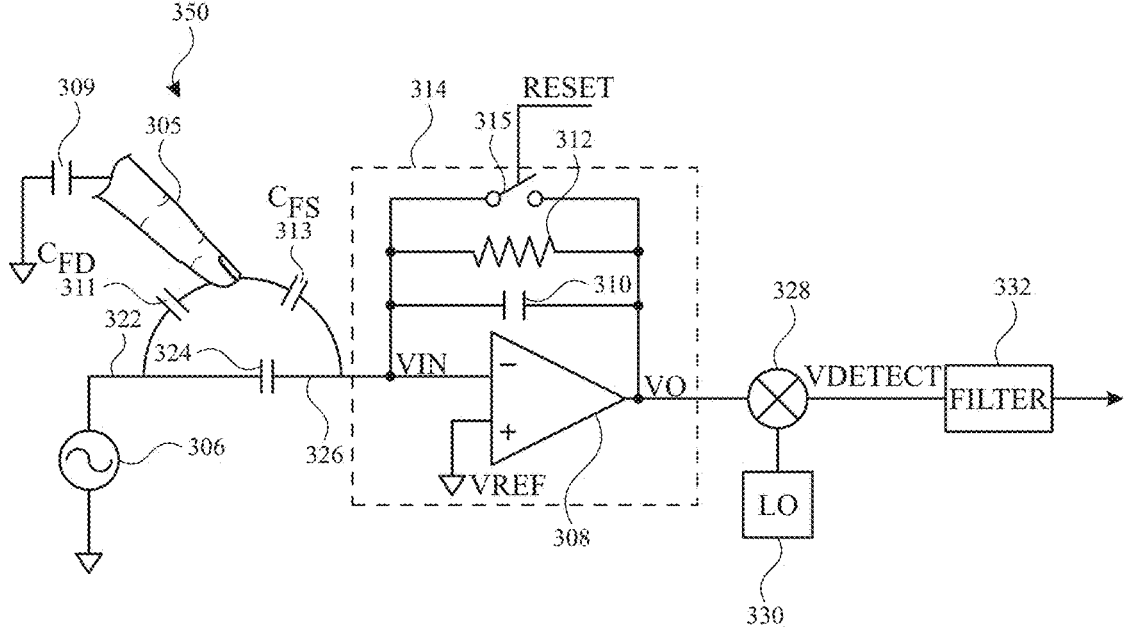
FIG. 3B illustrates a touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When an object (e.g., finger 305) approaches the touch-node created by the intersection of drive line 322 and sense line 326, mutual capacitance 324 can change (e.g., decrease). This change in mutual capacitance 324 can be detected to indicate a touch or proximity event at the touch-node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch-sensing circuit elements of the touch-sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
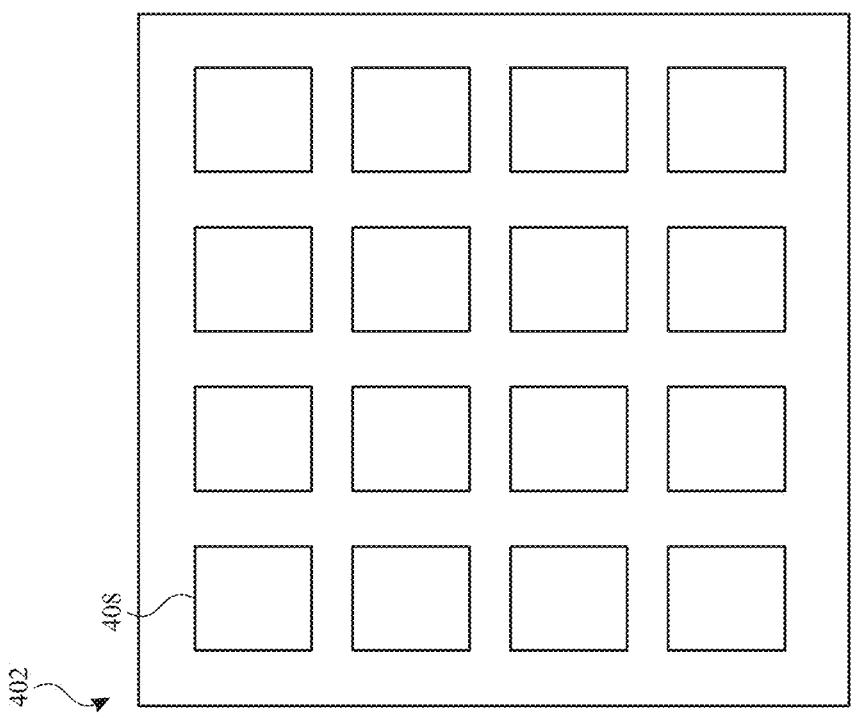
FIG. 4B illustrates a touch screen or touch sensor panel with touch-node electrodes arranged in a pixelated touch-node electrode configuration according to examples of the disclosure.
Figure 4A:
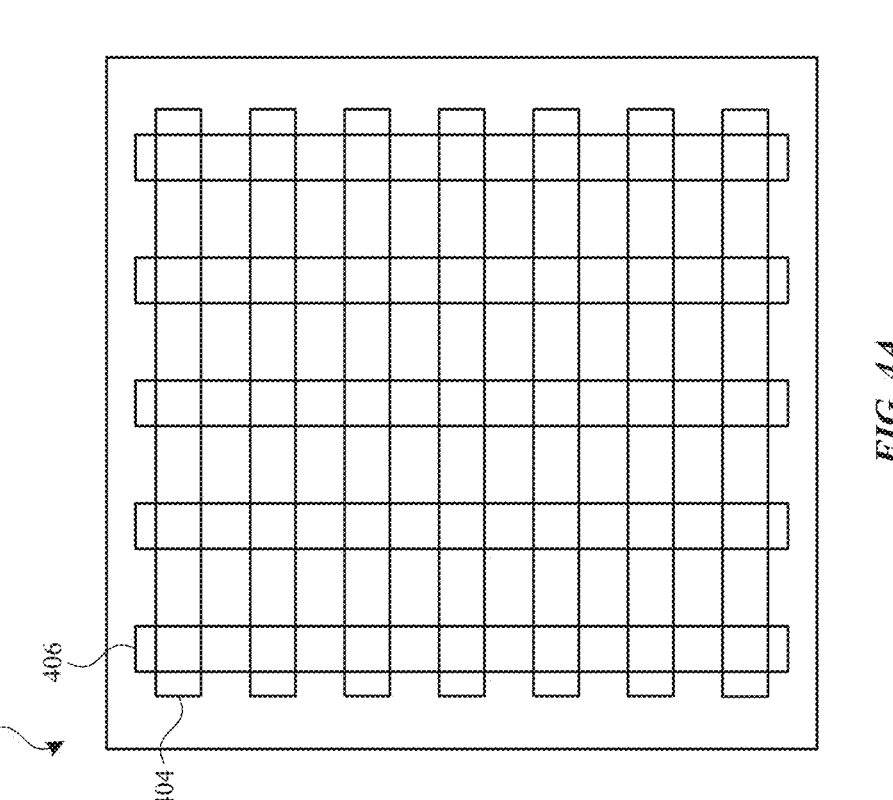
FIG. 4A illustrates a touch screen or touch sensor panel with touch electrodes arranged in rows and columns according to examples of the disclosure.

FIG. 4A illustrates a touch screen or touch sensor panel 400 with touch electrodes 404 and 406 arranged in rows and columns according to examples of the disclosure. Specifically, touch screen/panel 400 can include a plurality of touch electrodes 404 disposed as rows, and a plurality of touch electrodes 406 disposed as columns. Touch electrodes 404 and touch electrodes 406 can be on the same or different material layers on touch screen/panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen/panel 400 can sense the self-capacitance of touch electrodes 404 and 406 to detect touch and/or proximity activity on touch screen/panel 400, and in some examples, touch screen/panel 400 can sense the mutual capacitance between touch electrodes 404 and 406 to detect touch and/or proximity activity on touch screen 400.

FIG. 4B illustrates a touch screen or touch sensor panel 402 with touch-node electrodes 408 arranged in a pixelated touch-node electrode configuration according to examples of the disclosure. Specifically, touch screen/panel 402 can include a plurality of individual touch-node electrodes 408, each touch-node electrode identifying or representing a unique location on the touch screen/panel at which touch or proximity (i.e., a touch or proximity event) is to be sensed, and each touch-node electrode being electrically isolated from the other touch-node electrodes in the touch screen/panel, as previously described. Touch-node electrodes 408 can be on the same or different material layers on touch screen/panel 402. In some examples, touch screen/panel 402 can sense the self-capacitance of touch-node electrodes 408 to detect touch and/or proximity activity on touch screen/panel 402, and in some examples, touch screen/panel 402 can sense the mutual capacitance between touch-node electrodes 408 to detect touch and/or proximity activity on touch screen/panel 402.

Figure 5:
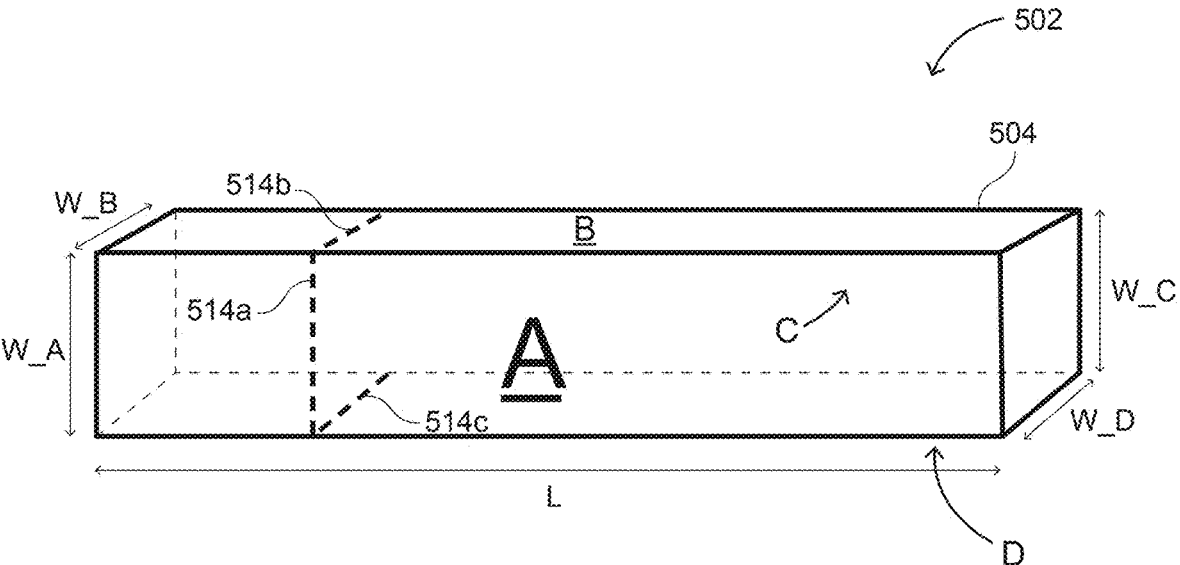
FIG. 5 illustrates an electronic device including a plurality of touch-sensitive surfaces according to examples of the disclosure.

In some examples, an electronic device (e.g., one of the touch-sensing devices illustrated in FIGS. 1A-1H) includes a plurality of touch-sensitive surfaces for detecting touch and/or proximity activity. For example, FIG. 5 illustrates a schematic representation of an electronic device 502 including a plurality of surfaces according to examples of the disclosure. In FIG. 5, electronic device 502 includes a housing 504 with a front surface A, top surface B, rear surface C, and bottom surface D. As illustrated, surface A is disposed opposite to surface C (e.g., parallel), and surface B is disposed opposite to surface D (e.g., parallel). Surface B and surface D are disposed between surface A and surface C (e.g., non-parallel to surfaces A and C). Although shown as a cuboid, it is understood that the housing 504 can have other shapes including non-planar surfaces.

In some examples, it is desirable to detect touch and/or proximity activity relative to one or more of the surface(s) A-D of electronic device 502. For example, a computing system (e.g., computing system 200 illustrated and described with reference to FIG. 2) is configured to selectively respond to user input provided on one or more of the surface(s) A-D of electronic device 502. For example, in accordance with a determination that a contact is detected on surface A, the computing system performs a first operation, and in accordance with a determination that a contact is detected on surface B, the computing system performs a second operation, different from the first operation. In some examples, a portion of the plurality of surfaces A-D of electronic device 502 are configured to be touch-sensitive. For example, surface A, surface B, and surface D are configured to be touch-sensitive, and surface C is generally not configured to be touch-sensitive. For example, when housing 504 corresponds to a strap or arm of a wearable device, one surface of the housing that is touching or proximate to the user (e.g., wrist or head) and that is generally inaccessible to touch input by fingers is configured to not be touch-sensitive, whereas other surfaces can be configured to be touch-sensitive. It should be appreciated that FIG. 5 illustrates an exemplary form factor of an electronic device including a plurality of touch-sensitive surfaces, and in some examples, the electronic device includes more or fewer than three touch-sensitive surfaces. For example, an electronic device includes at least a first touch-sensitive surface and a second touch-sensitive surface disposed at a non-parallel angle to the first touch-sensitive surface (e.g., the second touch-sensitive surface is disposed between 1 and 179 degrees relative to a plane parallel to the first touch-sensitive surface). In some examples, the second touch-sensitive surface is 90 degrees ±10 degrees relative to the first touch-sensitive surface.

FIG. 5 illustrates a plurality of dimensions of electronic device 502. For example, FIG. 5 illustrates a length (L) of electronic device 502 (and/or of surfaces A-D). In some examples, surfaces A-D of electronic device 502 each has a length (L) that is less than 200 mm (e.g., 10, 25, 50, 80, 100, 125, 150, or 200 mm). Further, FIG. 5 illustrates widths, W_A, W_B, W_C, and W_D, of surfaces A-D, respectively. In some examples, W_A, W_B, W_C, and W_D are each less than 30 mm (e.g., 1, 2, 5, 10, 15, 20, 25, or 30 mm). In some examples, surfaces A and C have a different width than surfaces B and D (e.g., W_A and W_C are less than 30 mm, and W_B and W_D are less than 10 mm (e.g., 1, 2, 5, or 10 mm)).

Examples of electronic devices including a plurality of touch-sensitive surfaces include mobile phones (e.g., telephone 136), personal computers (e.g., personal computer 144), tablet computers (e.g., tablet computing device 148), wearable devices (e.g., wearable device 150 (e.g., including strap 152 or a band) or a head-mounted display (e.g., including a frame with one or more support arms)), and remote controllers (e.g., remote control device 154). In some examples, the housing (e.g., housing 504) of the electronic device (e.g., electronic device 502) includes one or more edges that define the plurality of touch-sensitive surfaces (e.g., as shown in FIG. 5, a longitudinal edge distinguishes surface A from surface B). In some examples, the electronic device includes one or more curved and/or slanted surfaces (e.g., earbud 156 or stylus 158). For example, a first touch-sensitive surface curves into a second touch-sensitive surface of the electronic device. In some examples (e.g., when an electronic device includes curved surfaces), a computing system (e.g., computing system 200) of the electronic device defines the plurality of touch-sensitive surfaces (e.g., as described with reference to FIGS. 8A-8D). For example, in accordance with a determination by the computing system that a touch input is detected (e.g., by estimating a location of a centroid of the touch input) on a first portion of a housing of the electronic device, the touch input is determined to be on a first touch-sensitive surface of the electronic device, and in accordance with a determination by the computing system that the touch input is detected on a second portion, different from the first portion, of the housing of the electronic device, the touch input is determined to be on a second touch-sensitive surface, different from the first touch-sensitive surface, of the electronic device.

Figure 6A:
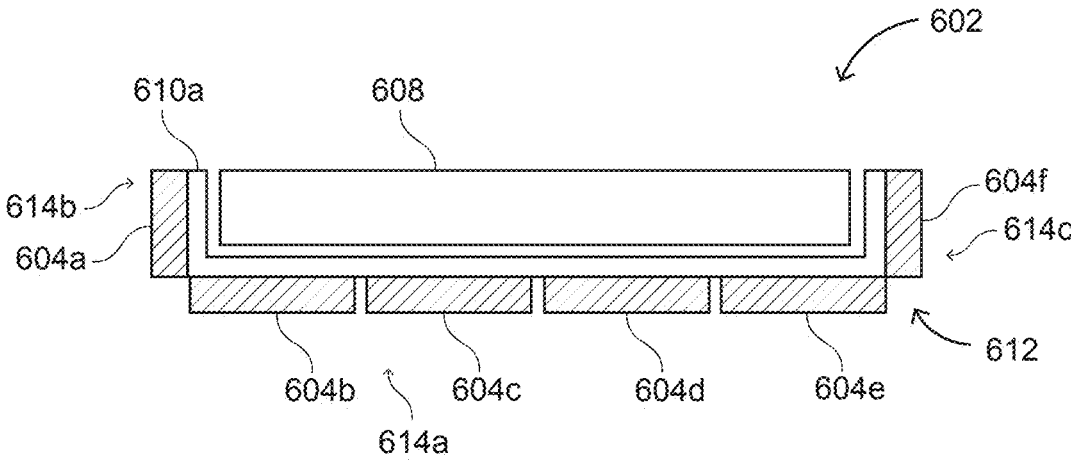
FIGS. 6A-6C illustrate sectioned-views of examples of an electronic device including a plurality of touch-sensitive surfaces according to examples of the disclosure.
Figure 6B:
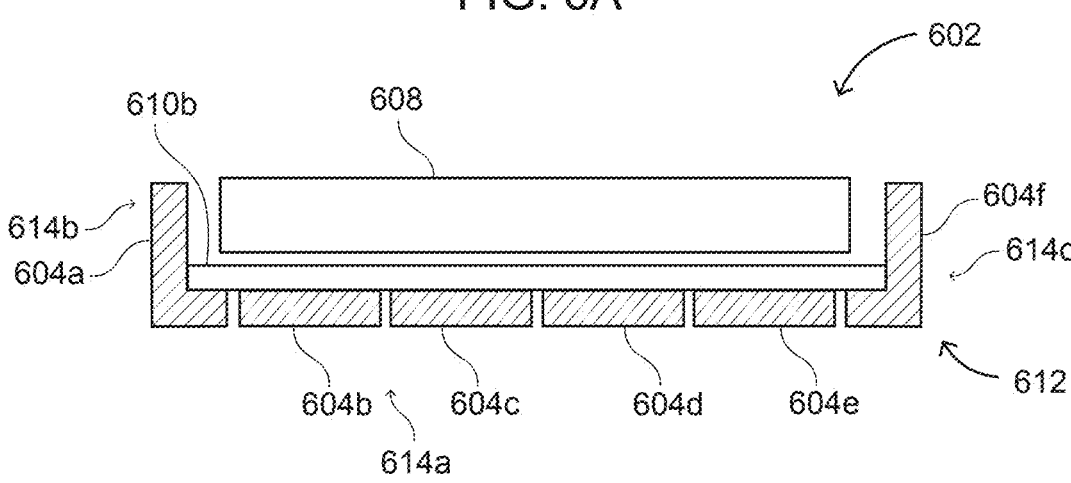
Figure 6C:
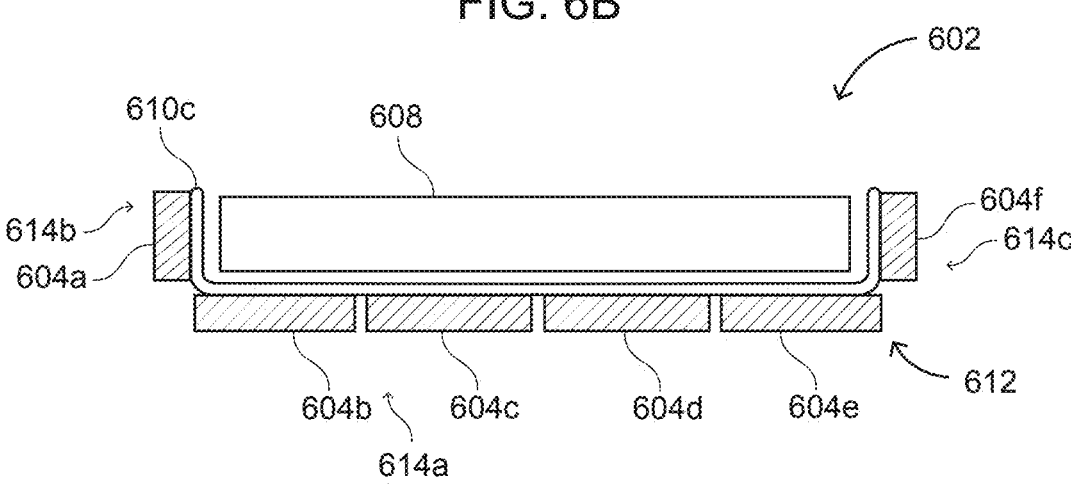

FIGS. 6A-6C illustrate cross-sectional-views of examples of an electronic device including a plurality of touch-sensitive surfaces according to examples of the disclosure. The cross-sectional views of FIGS. 6A-6C correspond to the cross-sectional lines shown in FIG. 5 as sections 514a-514c, representing a portion of a plane. In some examples, sections 514a-514c correspond to sections of a touch sensor panel that is disposed on an interior surface of housing 504. In some examples, sections 514a-514c correspond to sections 614a-614c of touch sensor panel 612 shown and described with reference to FIGS. 6A-6C.

As shown in FIGS. 6A-6C, electronic device 602 (e.g., having one or more characteristics of electronic device 502) comprises a touch sensor panel 612 including a plurality of touch electrodes 604a-604f. In some examples, touch electrodes 604a-604f correspond to electrodes from one of the arrangements as shown and described with reference to FIGS. 4A and 4B. In some examples, touch electrodes 604a-604f are coupled to a touch-sensing circuit as shown and described with reference to FIGS. 3A and/or 3B to detect mutual capacitance and/or self-capacitance touch and/or proximity activity relative to one or more touch-sensitive surfaces of electronic device 602.

In some examples, touch sensor panel 612 includes a substrate (e.g., substrates 610a-610c) that the plurality of touch electrodes 604a-604f are formed on. The touch node electrodes can be routed to touch-sensing circuitry on the substrate. For example, the substrate is laminated and disposed on one or more surfaces of a housing of electronic device 602 (e.g., housing 504 of electronic device 502 shown in FIG. 5). For example, as described herein, the substrate being laminated and disposed on one or more surfaces of a housing includes a configuration in which the substrate including the touch electrodes is optionally laminated to interior surfaces of one or more surfaces of the housing, optionally laminated to exterior surfaces of one or more surfaces of the housing, and/or optionally integrated within one or more surfaces of the housing. FIGS. 6A-6C show a first section 614a, a second section 614b, and a third section 614c of touch sensor panel 612. Each of these sections can correspond to one of the surfaces shown in FIG. 5. For example, first section 614a can correspond to surface A (and section 514a of the cross-sectional lines shown in FIG. 5), second section 614b can correspond to surface B (and section 514b of the cross-sectional lines shown in FIG. 5), and third section 614c can correspond to surface D (and section 514c of the cross-sectional lines shown in FIG. 5).

In some examples, touch electrodes 604b-604e are disposed in a first section 614a of touch sensor panel 612. For example, first section 614a is disposed on a first touch-sensitive surface of electronic device 602 (e.g., the first touch-sensitive surface corresponds to surface A of electronic device 502 shown in FIG. 5). In some examples, touch electrode 604a is disposed in a second section 614b of touch sensor panel 612. For example, second section 614b is disposed on a second touch-sensitive surface of electronic device 602 (e.g., the second touch-sensitive surface corresponds to surface B of electronic device 502 shown in FIG. 5). In some examples, touch electrode 604f is disposed in a third section 614c of touch sensor panel 612. For example, third section 614c is disposed on a third touch-sensitive surface of electronic device 602 (e.g., the third touch-sensitive surface corresponds to surface D of electronic device 502 shown in FIG. 5).

As shown in FIGS. 6A-6C, second section 614b (and touch electrode 604a) is arranged parallel and opposite to third section 614c (and touch electrode 604f). Further, as shown in FIGS. 6A-6C, first section 614a (and touch electrodes 604b-604e) are arranged between and non-parallel to second section 614b (and touch electrode 604a) and third section 614c (and touch electrode 604f). In some examples, electronic device 602 includes a fourth surface (e.g., corresponding to surface C of electronic device 502 shown in FIG. 5), and touch sensor panel 612 includes a fourth section (e.g., disposed opposite of first section 614a and between second section 614b and third section 614c). The fourth surface is optionally not a touch-sensitive surface. In some examples, at least a portion of one or more touch electrodes of touch sensor panel 612 are disposed in the fourth section (e.g., as shown and described with reference to drive electrodes 706a-706e in FIG. 7A). In some examples, the sectional views of electronic device 602 illustrated in FIGS. 6A-6C include one column of electrodes or electrode segments, but the touch sensor panel includes a plurality of columns of electrodes or electrode segments (e.g., viewing a column wrapping around from the second section 614b to the first section 614a and then to the third section 614c. For example, touch electrodes 604b-604e can represent four electrode segments of a plurality of electrode segments arranged in rows along the length of the first section 614a. Similarly, touch electrode 604a can represent an electrode segment of a plurality of electrode segments arranged in a row along the length of the second section 614b, and touch electrode 604f can represent an electrode segment of a plurality of electrode segments arranged in a row along the length of the third section 614c.

FIGS. 6A-6C show different configurations of the substrates and touch electrodes. FIG. 6A illustrates an exemplary configuration of electronic device 602 that includes touch electrodes 604a-604f formed on a printed circuit board (PCB) substrate 610a (e.g., optionally including touch-sensing circuitry implemented on the PCB). In some examples, PCB substrate 610a is a monolithic substrate (e.g., of a rigid material). In some examples, PCB substrate 610a is not monolithic (e.g., PCB substrate 610a includes one or more segments to account for stress relief and/or space constraints within the housing of electronic device 602). In some examples, touch electrodes 604a-604f are formed on PCB substrate 610a from plates of conductive material (e.g., as described with reference to touch-node electrodes 408 of FIG. 4B), optionally interconnected with routing in the PCB. As shown in FIG. 6A, PCB substrate 610a is configured in a C-shape. The shape of substrate 610a creates space within the housing to accommodate a battery volume 608. Additionally or alternatively, the shape of the substrate reduce material and/or weight. For example, the C-shape is optionally formed by milling a portion of PCB substrate 610a during manufacturing. In some examples, battery volume 608 includes a battery and/or other electrical components disposed within the housing of electronic device 602 (e.g., battery volume 608 is enclosed by surfaces A-D of housing 504 of electronic device 502 shown in FIG. 5).

FIG. 6B illustrates an exemplary configuration of electronic device 602 that includes touch electrodes 604a and 604f disposed on multiple touch-sensitive surfaces of electronic device 602. In some examples, touch electrodes 604a and 604f are configured in an L-shape. As shown in FIG. 6B, a first portion of touch electrodes 604a and 604f (within first section 614a of touch sensor panel 612) are arranged parallel to touch electrodes 604b-604e on a monolithic PCB substrate 610b, and a second portion of touch electrodes 604a and 604f (within second section 614b and third section 614c of touch sensor panel 612) are arranged non-parallel to touch electrodes 604b-604e. In some examples, touch electrodes 604a and 604f are formed of a conductive material (e.g., sheet metal soldered to PCB substrate 610b). Although L-shaped electrodes are shown, touch electrodes 604a and 604f are optionally C-shaped electrodes, in which a portion of the touch electrodes wrap around PCB substrate 610b (not shown). In FIG. 6B, the second portion of touch electrodes 604a and 604f (e.g., disposed non-parallel to touch-node electrodes 604b-604e) and a second surface of PCB substrate 610b (e.g., opposite form the first surface that touch-node electrodes 604b-604e are formed on) create a battery volume 608 (e.g., to accommodate a battery or other electrical components of electronic device 602). In some examples, touch electrodes 604a and 604f are further disposed a fourth section of touch sensor panel 612 (e.g., disposed on a fourth surface corresponding to surface C of housing 504 of electronic device 502 shown in FIG. 5).

FIG. 6C illustrates an exemplary configuration of electronic device 602 that includes touch electrodes 604a-604f formed on a flexible PCB substrate 610c. For example, PCB substrate 610C is optionally monolithic and formed of a flexible material (e.g., polyimide film, polyester film and/or copper). PCB substrate 610c and/or touch electrodes 604a-604f are optionally formed of a transparent (partially or fully) semiconductor material, such as ITO (e.g., as described with reference to the touch electrodes in FIG. 4A). As shown in FIG. 6C, PCB substrate 610c is arranged to accommodate one or more electrical components (e.g., a battery) of electronic device 602 within battery volume 608.

Figure 7A:
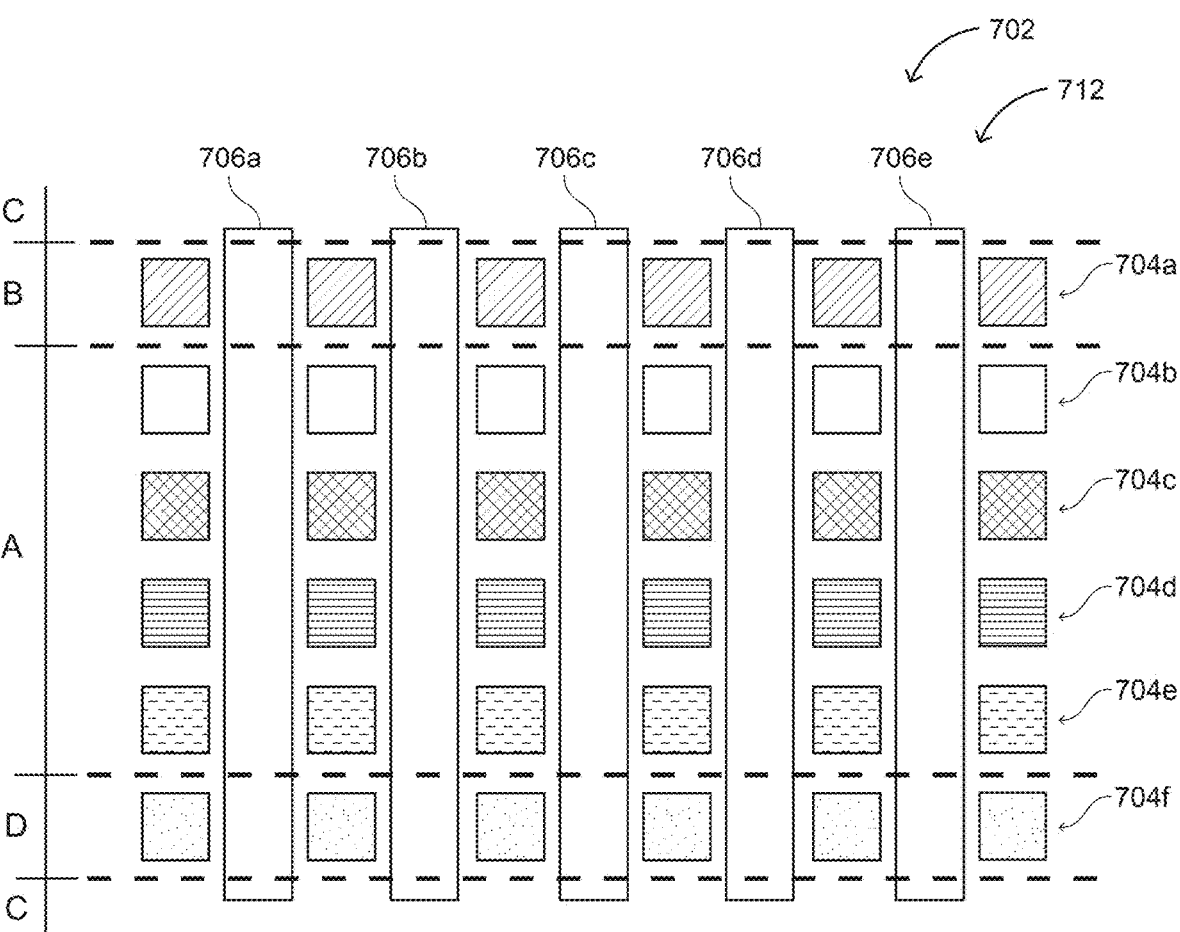
FIG. 7A illustrates a touch sensor panel of an electronic device including a plurality of touch-sensitive surfaces according to examples of the disclosure.

FIG. 7A illustrates a touch sensor panel of an electronic device including a plurality of touch-sensitive surfaces according to examples of the disclosure. In some examples, electronic device 702 has one or more characteristics of electronic device 502 and/or electronic device 602 shown and described with reference to FIGS. 5-6C. In some examples, the representation of electronic device 702 in FIG. 7A corresponds to an unfolded two-dimensional representation of electronic device 502 shown and described with reference to FIG. 5. For example, electronic device 702 includes surfaces A-D that optionally correspond to surfaces A-D of housing 504 shown and described with reference to FIG. 5. For example, surface A is disposed between and non-parallel to surfaces B and D (e.g., and surface A is opposite and optionally parallel to surface C). As shown in FIG. 7A, surfaces A-D are delineated using dashed reference lines overlayed on touch sensor panel 712 (e.g., the dashed reference lines correspond to edges of the housing of electronic device 702, such as the edges between surfaces A-D of housing 504 of electronic device 502 shown in FIG. 5).

Touch sensor panel 712 of electronic device 702 includes rows of touch electrodes 704a-704f and columns of elongated electrodes 706a-706e. As shown in FIG. 7A, each row of touch electrodes 704a-704f include a plurality of electrode segments. In some examples, each of the electrode segments in a respective row of electrode segments can be connected together to form a respective row electrode of touch electrodes 704a-704f (e.g., as described below). For example, the electrode segments disposed on surface B are connected together to form touch electrode 704a. In some examples, touch sensor panel 712 has one or more characteristics of touch sensor panel 612 shown and described with reference to FIGS. 6A-6C. For example, one column of electrode segments shown in FIG. 7A can correspond to the column of touch electrode segments 604a-604f in FIGS. 6A-6C.

In some examples, a respective section of touch sensor panel 712 is disposed on a respective surface of electronic device 702. For example, a first section of touch sensor panel 712 (e.g., having one or more characteristics of first section 614a of touch sensor panel 612 shown and described with reference to FIGS. 6A-6C), is disposed on surface A. For example, a second section of touch sensor panel 712 (e.g., having one or more characteristics of second section 614b of touch sensor panel 612 shown and described with reference to FIGS. 6A-6C), is disposed on surface B. For example, a third section of touch sensor panel 712 (e.g., having one or more characteristics of third section 614c of touch sensor panel 612 shown and described with reference to FIGS. 6A-6C), is disposed on surface D. For example, a fourth section of touch sensor panel 712 is disposed (at least partially) on surface C. In some examples, touch sensor panel 712 is disposed within a housing of electronic device 702 (e.g., housing 504 of electronic device 502 shown and described with reference to FIG. 5).

In some examples, touch sensor panel 712 is configured to detect mutual capacitance touch and/or proximity activity relative to one or more of surfaces A-D (e.g., touch sensor panel 712 includes touch-sensing circuitry as shown and described with reference to FIG. 3B). For example, touch electrodes 704a-704f correspond to mutual capacitance sense electrodes (e.g., having one or more characteristics of mutual capacitance sense line 326 shown and described with reference to FIG. 3B), and elongated electrodes 706a-706b correspond to drive electrodes that are driven (e.g., selectively by the touch-sensing circuitry) with a stimulation signal (e.g., elongated electrodes 706a-706e have one or more characteristics of mutual-capacitance drive line 322 shown and described with reference to FIG. 3B). Alternatively, or additionally, in some examples, touch sensor panel 712 is configured to detect self-capacitance touch and/or proximity activity relative to one or more of surfaces A-D (e.g., touch sensor panel 712 includes touch-sensing circuitry as shown and described with reference to FIG. 3A). For example, touch electrodes 704a-704f and/or elongated electrodes 706a-706e correspond to self-capacitance sense electrodes. In some examples, touch electrodes 704a-704f and/or elongated electrodes 706a-706e are coupled to the same touch-sensing circuitry (e.g., including sense channels (e.g., having one or more characteristics of sense channels 208 described with reference to FIG. 2) routed to a same touch controller (e.g., having one or more characteristics of touch controller 206)).

In some examples, different sections of touch sensor panel 712 are coupled to different touch-sensing circuitry (e.g., touch electrodes 704a and/or 704f are coupled to a different touch controller from touch electrodes 704b-704e). In some examples, touch electrodes 704a-704f and elongated electrodes 706a-706e are formed on a same substrate (e.g., having one or more characteristics of PCB substrates 610a-610c shown and described with reference to FIGS. 6A-6C). For example, touch electrodes 704a-704f and elongated electrodes 706a-706e are formed on a same side of the substrate. For example, touch electrodes 704a-704f and elongated electrodes 706a-706e are formed on different sides of the substrate (e.g., in a double-sided configuration).

Figure 7B:
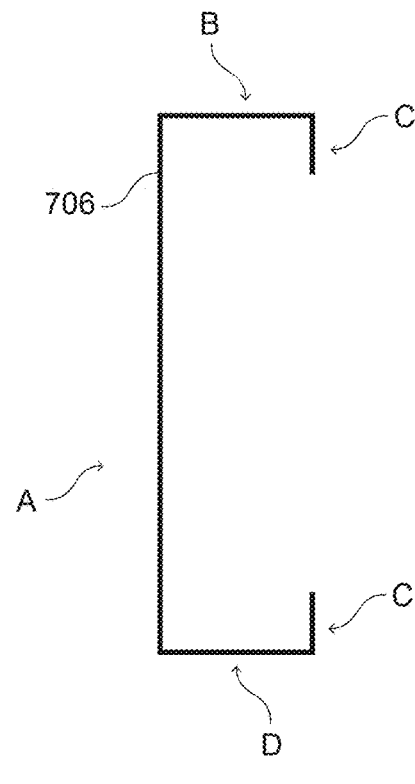
FIG. 7B illustrates a schematic representation of an elongated electrode of a touch sensor panel according to examples of the disclosure.

In FIG. 7A, elongated electrodes 706a-706e are arranged in columns on touch sensor panel 712 adjacent to one or more electrode segments of touch electrodes 704a-704f. As shown in FIG. 7A, each elongated electrode 706a-706e separates a pair of electrode segments within a row on touch sensor panel 712. Further, elongated electrodes 706a-706e are disposed on multiple surfaces of electronic device 702. As shown in FIG. 7A, elongated electrodes 706a-706e are disposed on surface A, surface B, surface D, and surface C (e.g., at least a portion of surface C). To span multiple non-parallel surfaces of electronic device 702, elongated electrodes 706a-706e are formed with multiple non-parallel portions. FIG. 7B illustrates an exemplary side-view of an elongated electrode 706 according to examples of the disclosure. For example, elongated electrode 706 shown in FIG. 7B is a representation of one of elongated electrodes 706a-706e included in touch sensor panel 712 in FIG. 7A. As shown in the side-view in FIG. 7B, elongated electrode 706 includes a top portion that is disposed on surface B, and a bottom portion that is disposed on surface D. The top and bottom portions of elongated electrode 706 are arranged non-parallel to a portion of elongated electrode 706 disposed on surface A. Further, as shown in FIG. 7B, elongated electrode 706 optionally extends (e.g., wraps around) to surface C (e.g., a rear surface of electronic device 702). For example, elongated electrode 706 includes flanging portions disposed at least partially on surface C (e.g., the flanging portions project from the top and the bottom portions of elongated electrode 706).

Figure 7C:
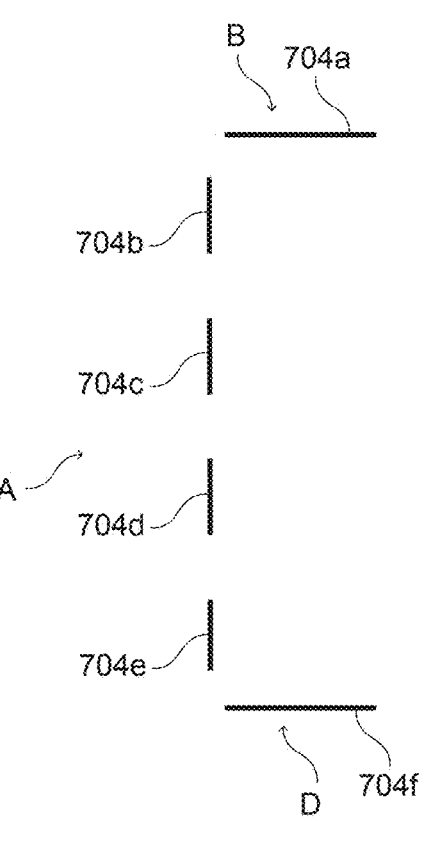
FIG. 7C illustrates a schematic representation of electrode segments of a touch sensor panel according to examples of the disclosure.

As shown in FIG. 7A, touch electrodes 704a-704f are arranged in rows on touch sensor panel 712. In some examples, each of the electrode segments in the row disposed on surface B can be electrically connected with routing (not shown) to form touch electrode 704a (e.g., similar to row touch electrode 404). In some examples, one or more electrode segments of touch electrodes 704a-704f correspond to touch electrodes 604a-604f shown and described with reference to FIGS. 6A-6C (e.g., touch electrodes 604a-604f represent a column of electrode segments of touch electrodes 704a-704f spanning from surface B to surface D). In FIG. 7A, touch electrode 704a (e.g., the row of electrode segments forming touch electrode 704a) is disposed on surface B, touch electrodes 704b-704e (e.g., the rows of electrode segments forming touch electrodes 704b-704e) is disposed on surface A, and touch electrodes 704f (e.g., the row of electrode segments forming touch electrode 704f) is disposed on surface D. In some examples, touch electrodes 704b-704e are disposed between and non-parallel to touch electrodes 704a and 704f (because surface A is arranged between and non-parallel to surfaces B and D). FIG. 7C illustrates an exemplary side-view of a column of electrode segments of touch electrodes 704a-704f according to examples of the disclosure. As shown in FIG. 7C, the electrode segments of touch electrodes 704b-704e are disposed between and non-parallel to the electrode segments of touch electrodes 704a and 704f. In FIG. 7C, the electrode segments of touch electrodes 704b-704e are disposed on surface A (and not disposed on surface B or D), the electrode segment of touch electrode 704a is disposed on surface B (and not disposed on surface A or D), and the electrode segment of touch electrode 704f is disposed on surface D (and not disposed on surfaces A or B). For example, touch electrodes 704a-704f are formed along a single plane (e.g., unlike elongated electrodes 706a-706e, touch electrodes 704a-704f are substantially planar). In some examples, the electrode segments of touch electrodes 704a and 704f include the same (or approximately the same, such as within 0.1, 0.2, 0.5, 1, 2, 5, or 10 percent of the same) surface area as the electrode segments of touch electrodes 704b-704e. For example, a length of a respective electrode segments within the rows of touch electrodes 704a-704f is 0.1, 0.5, 0.75, 1, 1.2, 1.25, 1.5, 1.75, 2, 2.2, 2.25, 2.5, 2.75, 3, 3.5, 4, 4.5, 5, or 10 mm. In some examples, one or more segments of touch electrodes 704a and 704f include a different surface area from one or more segments of touch electrodes 704b-704e (e.g., a respective electrode segment of touch electrodes 704a or 704f includes a smaller or larger surface area than a respective electrode segment within touch electrodes 704b-704e). It should be appreciated that electrodes (e.g., touch electrodes 704a-704f and/or elongated electrodes 706a-706e) on touch sensor panel 712 may be a formed with a size that is based on the form factor of electronic device 702 (e.g., based on one or more dimensions of surfaces A-D).

In some examples, electrode segments within a respective row of touch sensor panel 712 are coupled by routing (not shown) to form a combined sense electrode. For example, electronic device 702 is configured to sense (e.g., through the touch-sensing circuitry) a signal from each row of electrode segments (e.g., that form touch electrodes 704a-704f) while one or more adjacent elongated electrodes 706-706e are driven with a stimulation signal (e.g., in a mutual-capacitance sensing configuration). As shown in FIG. 7A, each row of electrode segments include a shared fill-pattern to schematically represent that electrode segments within a given row form a row sense electrode (e.g., the electrode segments forming touch electrode 704a include a different fill pattern from the electrode segments forming touch electrode 704c). Alternatively, in some examples, electronic device 702 is configured to detect electrode segments individually (e.g., electrode segments are not coupled to form a row sense electrode). Alternatively, in some examples, a portion of the electrode segments in a respective row of touch sensor panel 712 are coupled to form sense electrodes (e.g., a set of two or three electrode segments in a row are combined to form a sense electrode).

It should be appreciated that FIG. 7A represents an exemplary configuration of touch sensor panel 712, and in some examples touch sensor panel 712 includes different configurations (e.g., as shown and described with reference to FIGS. 7D-7F). FIG. 7A illustrates six rows of electrode segments (with six electrode segments within a row), and five columns of elongated electrodes. In some examples, touch sensor panel 712 includes a different number of electrodes than shown in FIG. 7A. For example, touch sensor panel 712 includes more or less than six electrode segments within a row of electrode segments. For example, touch sensor panel 712 includes more or less than six rows of electrode segments. For example, touch sensor panel 712 more or less than five columns of elongated electrodes.

In some examples, touch sensor panel 712 can be formed with different touch electrode patterns based on the type of touch and/or proximity inputs that are desired to be detected on the plurality of touch-sensitive surfaces of electronic device 702. For example, when it is desirable for the touch-sensitive surfaces of electronic device 702 (e.g., surfaces A, B, and D) to include the same (e.g., or similar) sensing resolution, electrode segments on each touch-sensitive surface are arranged in the same (e.g., or similar) pattern. For example, as shown in FIG. 7A, the rows of electrode segments (forming touch electrodes 704a-704f) are formed in a segmented pattern on surface A, surface B, and surface D. For example, it may be desirable to detect precise position (e.g., by estimated centroid location) and/or movement of an object (e.g., a finger or a stylus) relative to surface A, B, and/or D. In some examples, when it is desirable for different touch-sensitive surfaces of electronic device 702 to include different sensing resolutions, touch sensor panel 712 can include different touch electrode patterns on the plurality of touch-sensitive surfaces. For example, it may be desirable to detect precise position and/or movement of an object relative to surface A, but not relative to surfaces B and D (e.g., electronic device 702 is configured to detect stationary inputs (e.g., tap inputs) that are optionally not position dependent on surfaces B and D).

Figure 7D:
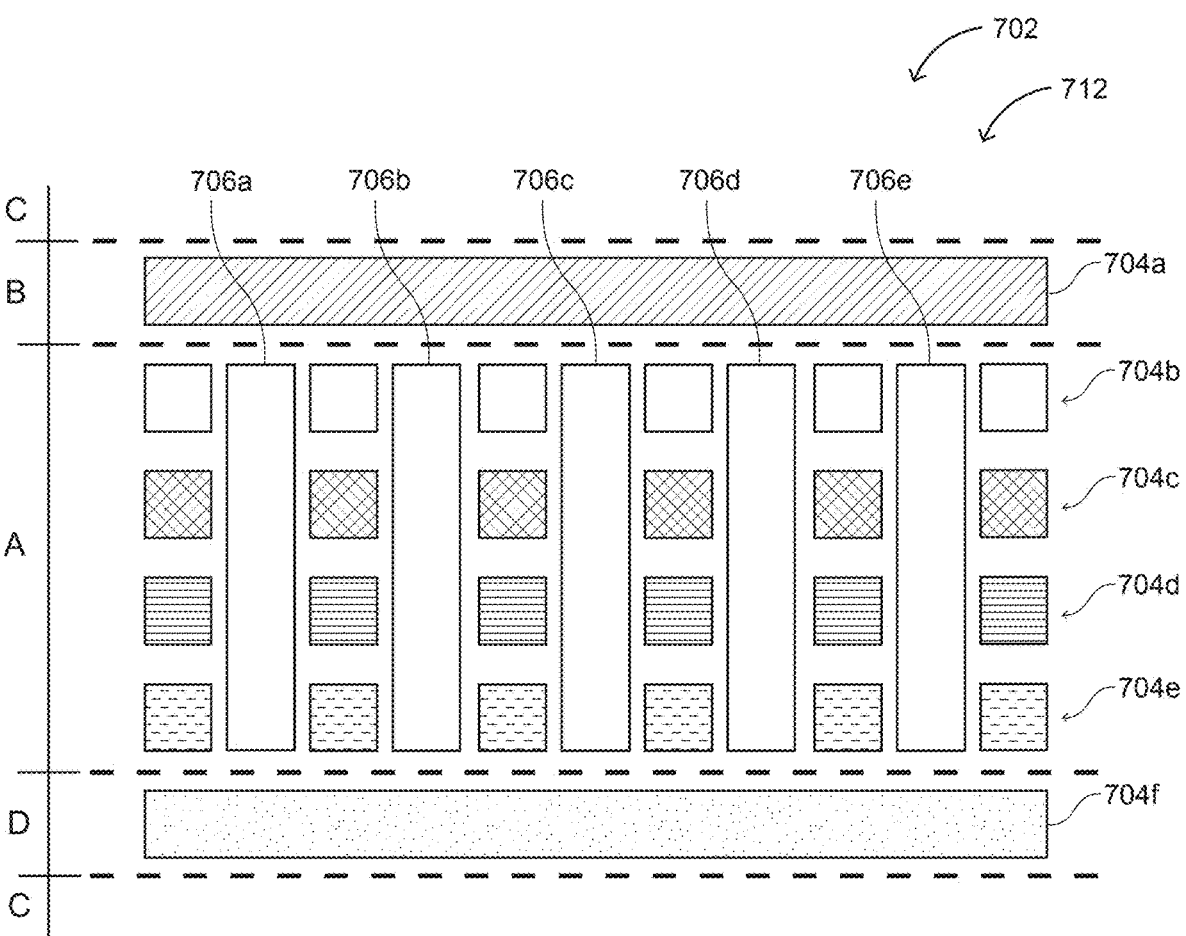
FIGS. 7D-7F illustrate a touch sensor panel of an electronic device including a plurality of touch-sensitive surfaces according to examples of the disclosure.
Figure 7E:
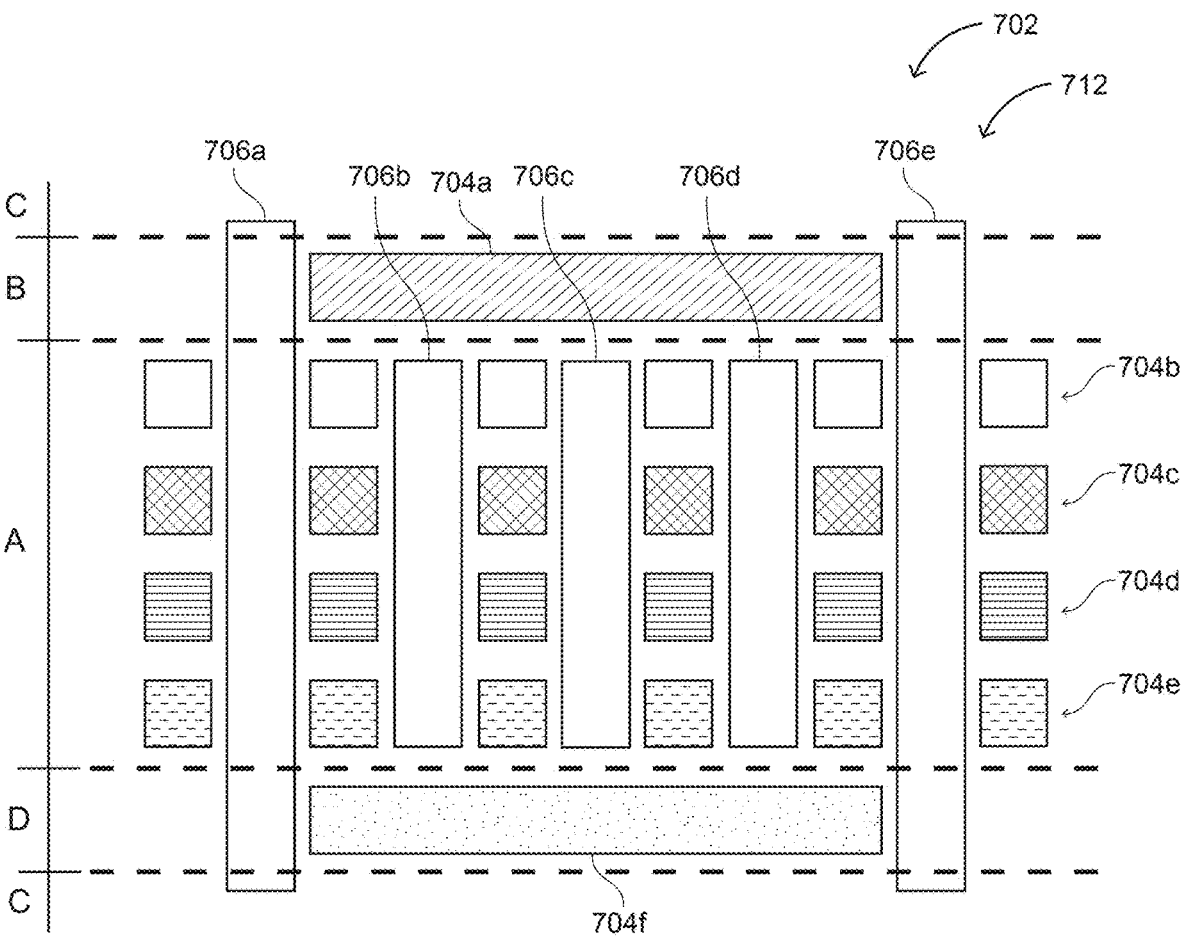
Figure 7F:
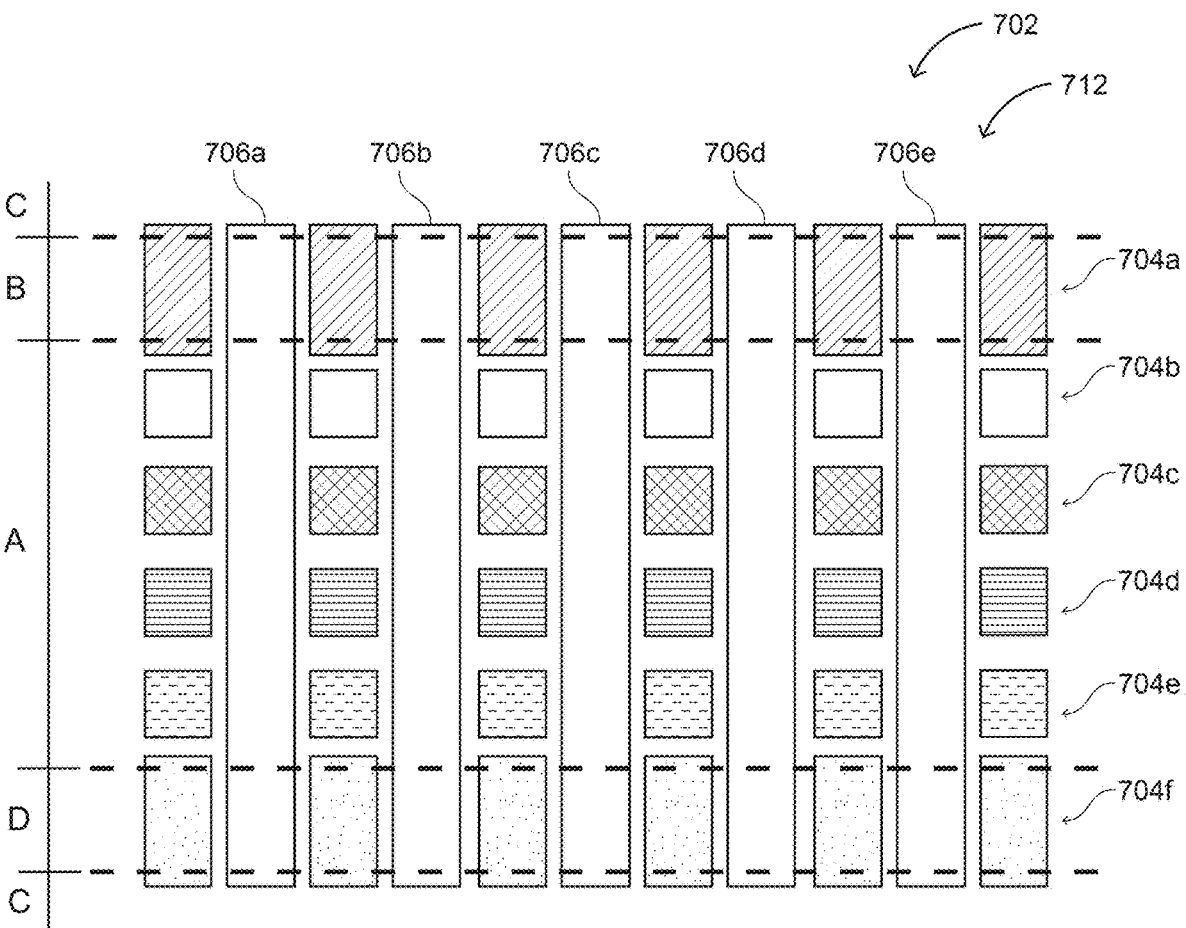

FIGS. 7D-7F illustrate exemplary configurations of touch sensor panel 712 of electronic device 702 according to examples of the disclosure. In some examples, the configurations of touch sensor panel 712 shown in FIGS. 7D-7F have one or more characteristics of the touch sensor panel 712 shown and described with reference to FIG. 7A. In FIG. 7D, touch electrode 704a disposed on surface B is elongated and touch electrode 704f disposed on surface D is elongated. In some examples, touch electrodes 704b-704e are formed by rows of electrode segments disposed on surface A (e.g., as shown in FIG. 7A). As shown in FIG. 7D, elongated electrodes 706a-706e are disposed on surface A (e.g., and not on surfaces B-D, as shown in FIGS. 7A-7B). In some examples, touch sensor panel 712 is configured to detect mutual capacitance touch and/or proximity activity relative to surface A (e.g., touch electrodes 704b-704e are sensed while elongated electrodes 706a-706e are driven with a stimulation signal). In some examples, in FIG. 7D, touch sensor panel 712 is configured to detect self-capacitance touch and/or proximity activity relative to surfaces B and D (e.g., elongated electrodes 704-704f are sensed by touch-sensing circuitry shown and described in FIG. 3A). For example, touch electrodes 704b-704e are coupled to different touch-sensing circuitry from touch electrodes 704a and 704f. Alternatively, in some examples, touch electrodes 704a and 704f are coupled to the same touch-sensing circuitry (e.g., mutual capacitance touch-sensing circuitry) as touch electrodes 704b-704e. For example, in an alternative configuration of touch sensor panel 712, elongated electrodes 706a-706e are formed to extend to surfaces B and D (e.g., as shown and described with reference to FIGS. 7B-7D) and overlap touch electrodes 704a and 704f (e.g., elongated electrodes 706a-706e are formed on an opposite side of a substrate from touch electrodes 704a and 704f). For example, one or more of elongated electrodes 706a-706e overlapping touch electrodes 704*a* and 704*f* are driven with a stimulation signal while touch electrodes 704*a* and/or 704*f* are sensed.

In FIG. 7E, touch sensor panel 712 includes elongated electrodes 706*a* and 706*e* that are disposed on surface A, surface B, surface C, and surface D. For example, elongated electrodes 706*a* and 706*e* have one or more characteristics of elongated electrode 706 shown and described with reference to FIG. 7B. As shown in FIG. 7E, elongated electrodes 706*a* and 706*e* are disposed adjacent to touch electrode 704*a* on surface B, and adjacent to touch electrode 704*f* on surface D. In some examples, elongated electrodes 706*a* and 706*e* are formed on a same side of a substrate as touch electrodes 704*a* and 704*f* (and optionally on the same side of the substrate as touch electrodes 704*b*-704*e*). In some examples, touch electrodes 704*a* and 704*f* are coupled to the same touch-sensing circuitry as touch electrodes 704*b*-704*e*. In some examples, in FIG. 7E, electronic device 702 is configured to detect mutual capacitance touch and/or proximity activity relative to surfaces B and D. For example, elongated electrode 706*a* and/or 706*e* are driven with a stimulation signal while touch electrodes 704*a* and/or 704*f* are sensed.

Figure 7G:
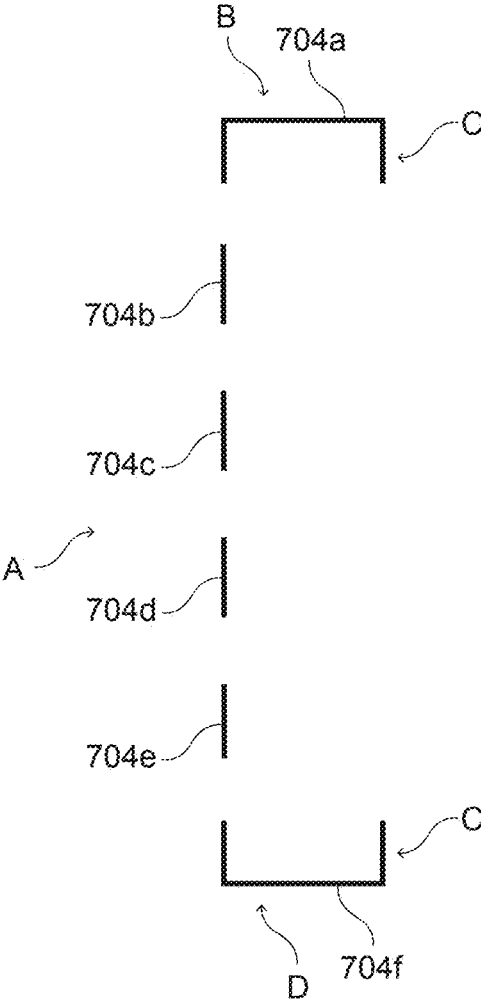
FIG. 7G illustrates a schematic representation of electrode segments of a touch sensor panel according to examples of the disclosure.

In some examples, it is desirable to form one or more of the electrode segments of touch electrodes 704*a* and 704*f* (e.g., as shown in FIG. 7A) on multiple sections of touch sensor panel 712 (e.g., to smooth a profile between different sections of touch sensor panel 712 that are otherwise disposed at non-parallel angles). In FIG. 7F, the electrode segments of touch electrodes 704*a* and 704*f* are disposed at least partially on surfaces A and C. To span multiple non-parallel surfaces of electronic device 702, the electrode segments of touch electrodes 704*a* and 704*f* are formed with multiple non-parallel portions. FIG. 7G illustrates an exemplary side-view of a column of electrode segments of touch electrodes 704*a*-704*f* according to examples of the disclosure. For example, the side-view illustrated in FIG. 7G is a representation of one column of electrode segments of touch electrodes 704*a*-704*f* in FIG. 7F. As shown in FIG. 7G, the electrode segment of touch electrode 704*a* includes a top portion that is disposed on surface B. The top portion of electrode segment of touch electrode 704*a* is disposed between and non-parallel to a first portion that is disposed on surface A, and a second portion that is disposed on surface C. Further, in FIG. 7G, a bottom portion of the electrode segment of touch electrode 704*f* is disposed on surface D. The bottom portion of the electrode segment of touch electrode 704*f* is disposed between and non-parallel to a first portion that is disposed on surface A, and a second portion that is disposed on surface C. Alternatively, in some examples, the electrode segments of touch electrode 704*a* are disposed on surface B and one additional surface (e.g., surface A or surface C), and the electrode segments of touch electrode 704*f* are disposed on surface D and one additional surface (e.g., surface A or surface C). In some examples, the electrode segments of touch electrodes 704*a* and 704*f* are formed with a different (e.g., smaller or larger) surface area from the electrode segments of touch electrodes 704*b*-704*e*. In some examples, a respective electrode segment of touch electrode 704*a* or 704*f* is formed with a same surface area as a respective electrode segment of touch electrodes 704*b*-704*e*. In some examples, in FIG. 7F, touch electrodes 704*a*-704*f* are coupled to the same touch-sensing circuitry configured to detect mutual capacitance and/or self-capacitance touch and/or proximity activity relative to surfaces A, B, and D. In some examples, touch electrodes 704*a* and 704*f* are coupled to different touch-sensing circuitry from touch electrodes 704*b*-704*e*.

It should be appreciated that touch sensor panel 712 shown and described with reference to FIGS. 7A-7G can have alternative configurations. For example, touch sensor panel 712 can include rows of elongated electrodes (e.g., such as touch electrodes 704*a* and 704*f* shown in FIG. 7D) and columns of electrode segments (e.g., that can be connected to form one or more column touch electrodes). In some examples, touch sensor panel 712 includes only elongated electrodes (e.g., arranged in rows on each surface, or arranged in columns disposed on multiple surfaces). In some examples, touch sensor panel 712 includes only electrode segments (e.g., including at least one row of electrode segments disposed on surface A, at least one row of electrode segments disposed on surface B, and at least one row of electrode segments disposed on surface D). In some examples, elongated electrodes 706*a*-706*e* are disposed on surface A and at least one additional surface (e.g., surface B, surface C, and/or surface D). For example, elongated electrodes 706*a*-706*e* are disposed on surface A, and one additional surface (e.g., surface B or surface D). For example, elongated electrodes 706*a*-706*e* are disposed on surface A, surface B, and surface D (e.g., and are not disposed on surface C). It should also be appreciated that although touch electrodes 704*a*-704*f* can operate as sense electrodes and elongated electrodes 706*a*-706*e* can operate as drive electrodes as described with reference to the mutual capacitance configurations of touch sensor panel 712 in FIGS. 7A-7G, in some examples the rows of electrode segments (e.g., forming touch electrodes 704*a*-704*f*) can operate as drive electrodes and elongated electrodes 706*a*-706*e* can operate as sense electrodes (e.g., one or more electrode segments of the rows of electrode segments are driven with a stimulation signal while one or more adjacent elongated electrodes 706*a*-706*e* are sensed by touch-sensing circuitry).

FIGS. 8A-8D illustrate an electronic device detecting one or more touch inputs on a plurality of touch-sensitive surfaces according to examples of the disclosure. In some examples, electronic device 802*a* shown in FIGS. 8A-8D has one or more characteristics of electronic device 502, 602, and/or 702 shown and described with reference to FIGS. 5-7G. For example, touch sensor panel 812, touch electrodes 804*a*-804*f*, and elongated electrodes 806*a*-806*f* have one or more characteristics of touch sensor panel 712, touch electrodes 704*a*-704*f*, and elongated electrodes 706*a*-706*e* shown and described with reference to FIGS. 7A-7G. In some examples, as shown in FIGS. 8A-8D, the configuration of touch sensor panel 812 (e.g., the arrangement of touch electrodes 804*a*-804*f* and elongated electrodes 806*a*-806*e*) correspond to the configuration of touch sensor panel 712 shown in FIG. 7A. It should be appreciated that the touch sensing methods shown and described with reference to FIGS. 8A-8D are applicable to different configurations of touch sensor panel 812, such as the configurations of touch sensor panel 712 shown and described with reference to FIGS. 7D-7F.

It should be appreciated that the sensing methods of electronic device 802*a* can include any combination and/or pattern of driving, sensing and/or grounding of different portions of touch sensor panel 812 (e.g., including driving, sensing, and/or grounding different portions of touch electrodes 804*a*-804*f* (or the one or more electrode segments of touch electrodes 804*a*-804*f*) and/or elongated electrodes 806*a*-806*e*). For example, electronic device 802*a* can sense one row and/or column of the electrode segments of touch sensor panel 812 (e.g., which form a sense electrode as described with reference to FIG. 7A) at a time (e.g., by grounding the other rows and/or columns of electrode segments that are not being sensed by electronic device 802*a*). For example, a row of electrode segments (e.g., forming one of touch electrodes 804*a*-804*f*) is sensed while one or more adjacent elongated electrodes 806*a*-806*e* are selectively driven by a stimulation signal. In some examples, to avoid deficiencies in the detection of touch and/or proximity activity caused by parasitic capacitance between different touch-sensitive surfaces of electronic device 802*a* (e.g., between surface A, B, and/or D), one or more electrode segments of touch electrodes 804*a*-804*f* and/or elongated electrodes 806*a*-806*e* may be driven with the same reference potential (e.g., using a bootstrapping technique). For example, while sensing a self-capacitance of the row of electrode segments forming touch electrode 804*a*, the remaining rows of electrode segments forming touch electrodes 804*b*-804*f* are driven with the same potential. The same technique can be applied of sensing any of the other touch electrodes of touch sensor panel 812.

In some examples, sense electrodes disposed on surfaces B and D of electronic device 802*a* are a different size compared to sense electrodes disposed on surface A. For example, a form factor of electronic device 802*a* can require one or more electrode segments forming touch electrodes 804*a* and/or 804*f* to be a different (e.g., larger or smaller) size compared to one or more electrode segments forming touch electrodes 804*b*-804*e* (e.g., one or more dimensions of surfaces B and/or D are different from surface A). Additionally, or alternatively, in some examples, touch sensor panel 812 includes elongated sense electrodes disposed on surface B and surface D, and segmented sense electrodes disposed on surface A (e.g., as shown and described with reference to FIGS. 7D-7E). In configurations of touch sensor panel 812 that include different sizes of sense electrodes disposed on surfaces B and D compared to surface A, different signal levels may be received from sense electrodes disposed on surfaces B and D compared to from sense electrodes disposed on surface A. For example, in accordance with one or more electrode segments of touch electrodes 804*a* and/or 804*f* including a smaller size compared to one or more electrode segments of touch electrodes 804*b*-804*e*, the level of a signal received from a respective sense electrode (e.g., a row of coupled sense electrode segments, such as touch electrode 804*b*) from surface A may be higher than the level of a signal received from a respective sense electrode from surface B or D (e.g., from touch electrodes 704*a* and/or 704*f*).

In some examples, to accurately detect location and/or movement of an object relative to surfaces A, B, and D, electronic device 802*a* is configured to scale one or more signals received from sense electrodes of touch sensor panel 812 (e.g., from one or more of the electrode segments of touch electrodes 804*a*-804*f*). For example, electronic device 802*a* includes a computing system having one or more characteristics of computing system 200 shown and described with reference to FIG. 2. In some examples, the computing system includes a touch processor (e.g., having one or more characteristics of touch processor 202) that is configured to scale the different signal levels received (e.g., based on information and/or instructions stored in a memory of electronic device 802*a*) to accurately detect location and/or movement of an object relative to surfaces A, B, and/or D. In some examples, the computing system includes a touch controller (e.g., having one or more characteristics of touch controller 206) that includes a plurality of sense channels (e.g., having one or more characteristics of sense channels 208), and the sense channels can be tuned differently for detecting signal from sense electrodes disposed on surfaces B and D (e.g., touch electrodes 804*a* and/or 804*f*) compared to signal from sense electrodes disposed on surface A (e.g., touch electrodes 804*b*-804*e*). For example, one or more sense channels are tuned for detecting signals relative to a particular surface of electronic device 802 (e.g., one or more first sense channels are tuned for receiving signals from the electrode segments forming touch electrode 804*a*, one or more second sense channels are tuned for receiving signals from the electrode segments forming touch electrodes 804*b*-804*e*, and one or more third sense channels are tuned for receiving signals from the electrode segments forming touch electrode 804*f*). In some examples, scaling of the one or more signals received from the sense electrodes of touch sensor panel 812 is not necessary (e.g., the electrode segments of touch electrodes 804*a* and 804*f* include a same size as the electrode segments of touch electrodes 804*b*-804*e*), and the touch processor of electronic device 802*a* does not scale the received one or more signals.

In some examples, electronic device 802*a* performs different operations in response to detecting input on different touch-sensitive surfaces (e.g., a first operation is assigned to a touch input detected on surface A, and a second operation, different from the first operation, is assigned to a touch input detected on surface B). In some examples, to determine a respective touch-sensitive surface that an input is detected on, the computing system stores information and/or instructions in a memory (e.g., program storage 232 shown and described with reference to FIG. 2) assigning different sections of touch sensor panel 812 to corresponding touch-sensitive surfaces of electronic device 802*a* (e.g., a first section of touch sensor panel 812 is assigned to surface A, a second section of touch sensor panel 812 is assigned to surface B, and a third section of touch sensor panel 812 is assigned to surface D). In some examples, the sections of touch sensor panel 812 are defined by the housing of electronic device 802 (e.g., such as housing 504 of FIG. 5 that includes edges that structurally define surfaces A-D). For example, the different sections of touch sensor panel 812 correspond to sections 614*a*-614*c* of touch sensor panel 612 shown and described with reference to FIGS. 6A-6C. In some examples, the stored information and/or instructions include position thresholds relative to touch sensor panel 812 that define the different sections (e.g., the position thresholds correspond to the dashed reference lines shown on touch sensor panel 812 in FIGS. 8A-8D). For example, the housing of electronic device 802*a* includes curved surfaces (e.g., the form factor of electronic device 802*a* does not clearly define the different touch-sensitive surfaces), and the computing system defines a respective touch-sensitive surface a contact is detected on based on the stored information and/or instructions. For example, in accordance with a determination by the computer system that an input is detected above a first threshold position (e.g., using an estimated centroid location of the input), the input is determined to be detected on a first touch-sensitive surface (e.g., surface B), and in accordance with a determination by the computing system that the input is detected to be below the first threshold position, the input is determined to be detected on a second touch-sensitive surface (e.g., surface A). In accordance with the determination that the input is detected on the first touch-sensitive surface, electronic device 802*a* performs a first operation (e.g., the touch processor executes one or more instructions stored in the memory), and in accordance with the determination that the input is detected on the second touch-sensitive surface, the electronic device 802a performs a second operation, different from the first operation (e.g., the first operation and the second operation are different operations of the exemplary operations described below).

In some examples, electronic device 802a performs different operations in response to different types of touch and/or proximity activity detected relative to the plurality of touch-sensitive surfaces. In some examples, the computing system assigns different operations (e.g., through information and/or instructions stored in a memory) to different types of touch gestures. For example, a first operation is assigned to a stationary input (e.g., a tap input), and a second operation is assigned to a movement input (e.g., a swipe input). In some examples, a respective operation is assigned to a respective touch-sensitive surface and a type of gesture. For example, in response to a tap input on surface A, electronic device 802a performs a first operation, and in response to a tap input on surface B, electronic device 802a performs a second operation, different from the first operation. In some examples, electronic device 802a performs one or more operations in response to detecting a multi-surface touch input (e.g., a pair of contacts, as shown and described with reference to FIG. 8D). It should be appreciated that electronic device 802a can perform operations in response to various types of inputs (e.g., multi-tap inputs, tap-and-hold inputs, multi-directional swipe inputs, flick inputs, etc.). Exemplary operations performed by electronic device 802a include system operations, such as changing volume, display brightness, display color, and/or optical focus, or user interface operations, such as scrolling and/or selecting content presented by electronic device 802a (e.g., via a display).

In FIGS. 8A-8D, a schematic representation 802b is illustrated corresponding to electronic device 802a. For example, representation 802b illustrates a housing of electronic device 802a (e.g., an exterior view of surfaces A, B and D). As shown in FIGS. 8A-8D, contacts that are detected by electronic device 802a (e.g., and shown on touch sensor panel 812) are illustrated on representation 802b.

Figure 8A:
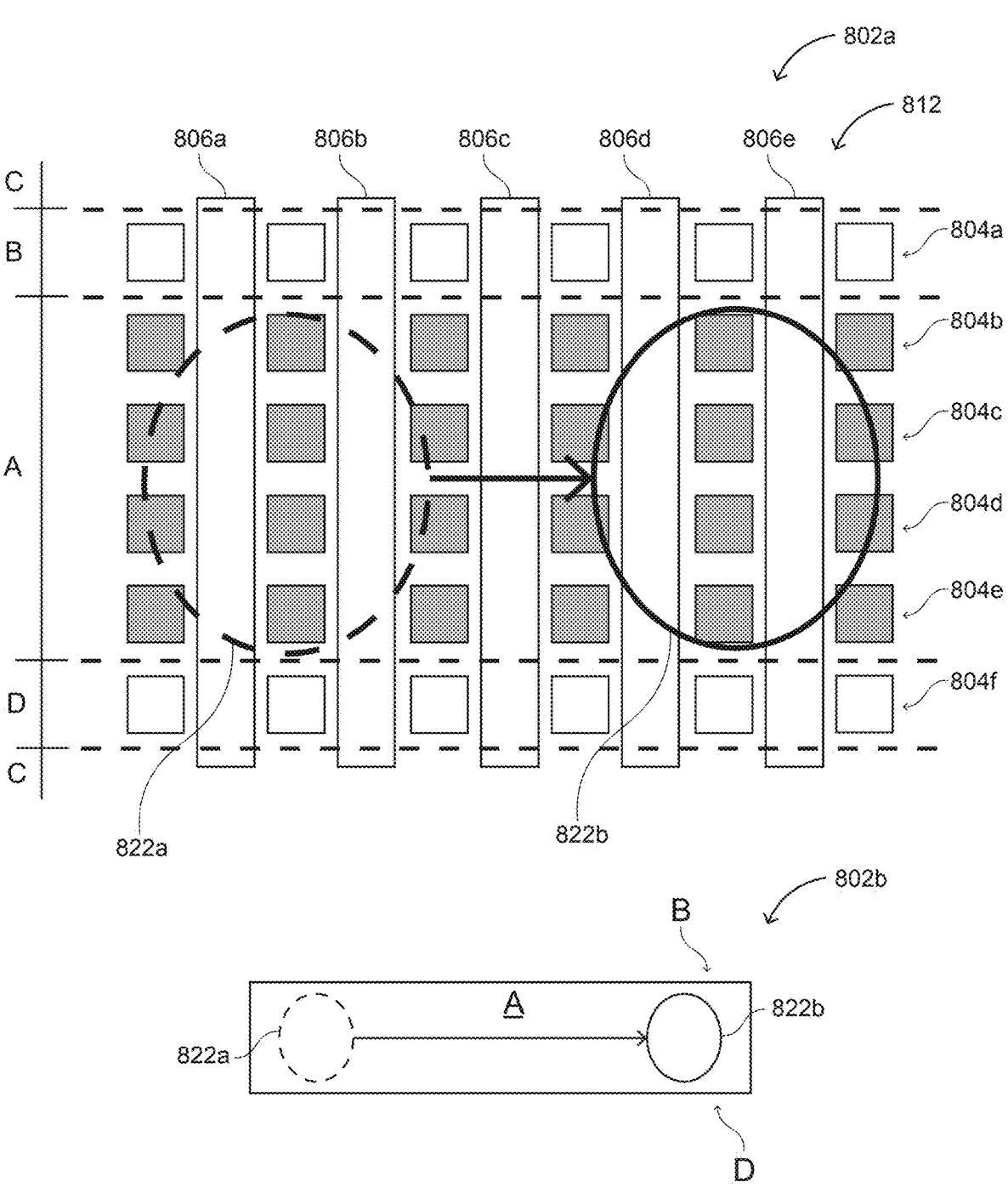
FIGS. 8A-8D illustrate an electronic device including a plurality of touch-sensitive surfaces detecting one or more contacts according to examples of the disclosure.

In FIG. 8A, electronic device 802a detects a touch gesture on surface A. For example, as shown in FIG. 8A, the gesture includes contact and movement of an object (e.g., a finger or a stylus) from a first position 822a to a second position 822b. In some examples, the touch-sensing circuitry of electronic device 802a detects the contact from signals received (e.g., via one or more sense channels) from touch electrodes 804b-804e (e.g., the contact the electrode segments of touch electrodes 804b-804e, as represented by the shaded fill pattern of the electrode segments of touch electrodes 804b-804e in FIG. 8A). For example, detecting the contact of the object includes driving one or more elongated electrodes 806a-806e with a stimulation signal while one or more adjacent touch electrodes 804b-804e are sensed. In some examples, in response to detecting the contact on surface A, electronic device 802a performs a corresponding operation (e.g., the touch processor executes one or more instructions stored in a memory to cause electronic device 802a to perform the operation). In some examples, electronic device 802a performs a different operation from the operation performed in FIG. 8A in response to detecting a different type of contact on surface A (e.g., in response to detecting a tap input). For example, in response to detecting the contact on surface A illustrated in FIG. 8A, electronic device 802a changes a system setting, such as audio output volume, and in response to the different type of contact on surface A, electronic device 802a performs a user interface operation, such as selecting a virtual element presented by electronic device 802a (e.g., via a display of electronic device 802a).

Figure 8B:
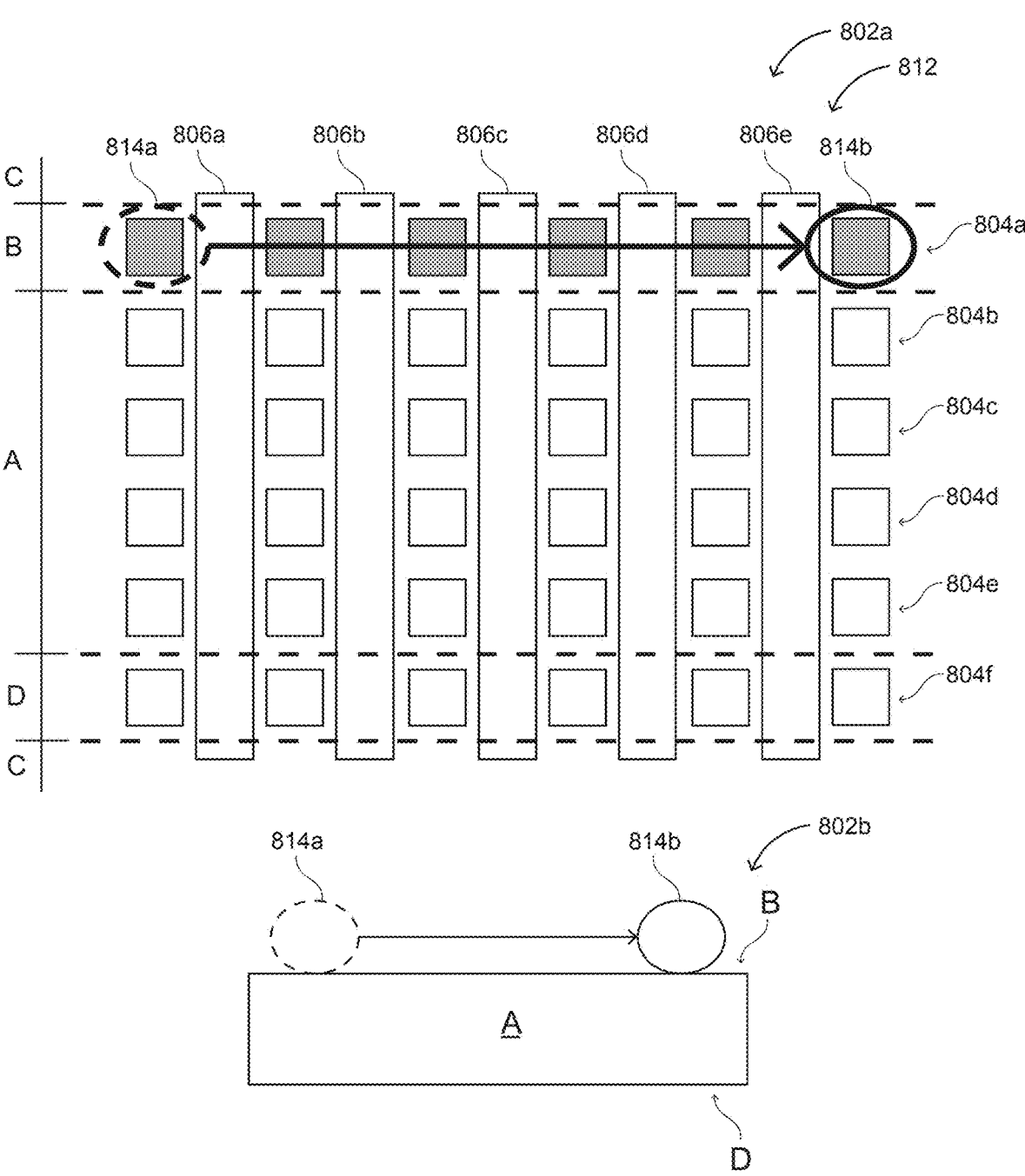

In FIG. 8B, electronic device 802a detects a touch gesture on surface B. For example, as shown in FIG. 8B, the gesture includes contact and movement of an object (e.g., a finger or a stylus) from a first position 814a to a second position 814b. In some examples, the touch-sensing circuitry of electronic device 802a detects the contact from signals received (e.g., via one or more sense channels) from touch electrode 804a (e.g., the contact saturates the electrode segments of touch electrode 804a, as represented by the shaded fill pattern of the electrode segments of touch electrode 804a in FIG. 8A). For example, detecting the contact of the object includes driving one or more elongated electrodes 806a-806e with a stimulation signal while touch electrode 804a is sensed. In some examples, in response to detecting the contact on surface B, electronic device 802a performs a corresponding operation (e.g., the touch processor executes one or more instructions stored in a memory to cause electronic device 802a to perform the operation). In some examples, the operation performed by electronic device 802a in FIG. 8B (in response to the contact on surface B) is different from the operation performed by electronic device 802a in FIG. 8A (in response to the contact on surface A). In some examples, electronic device 802a performs a different operation from the operation performed in FIG. 8B in response to detecting a different type of contact on surface B (e.g., in response to detecting a tap input).

Figure 8C:
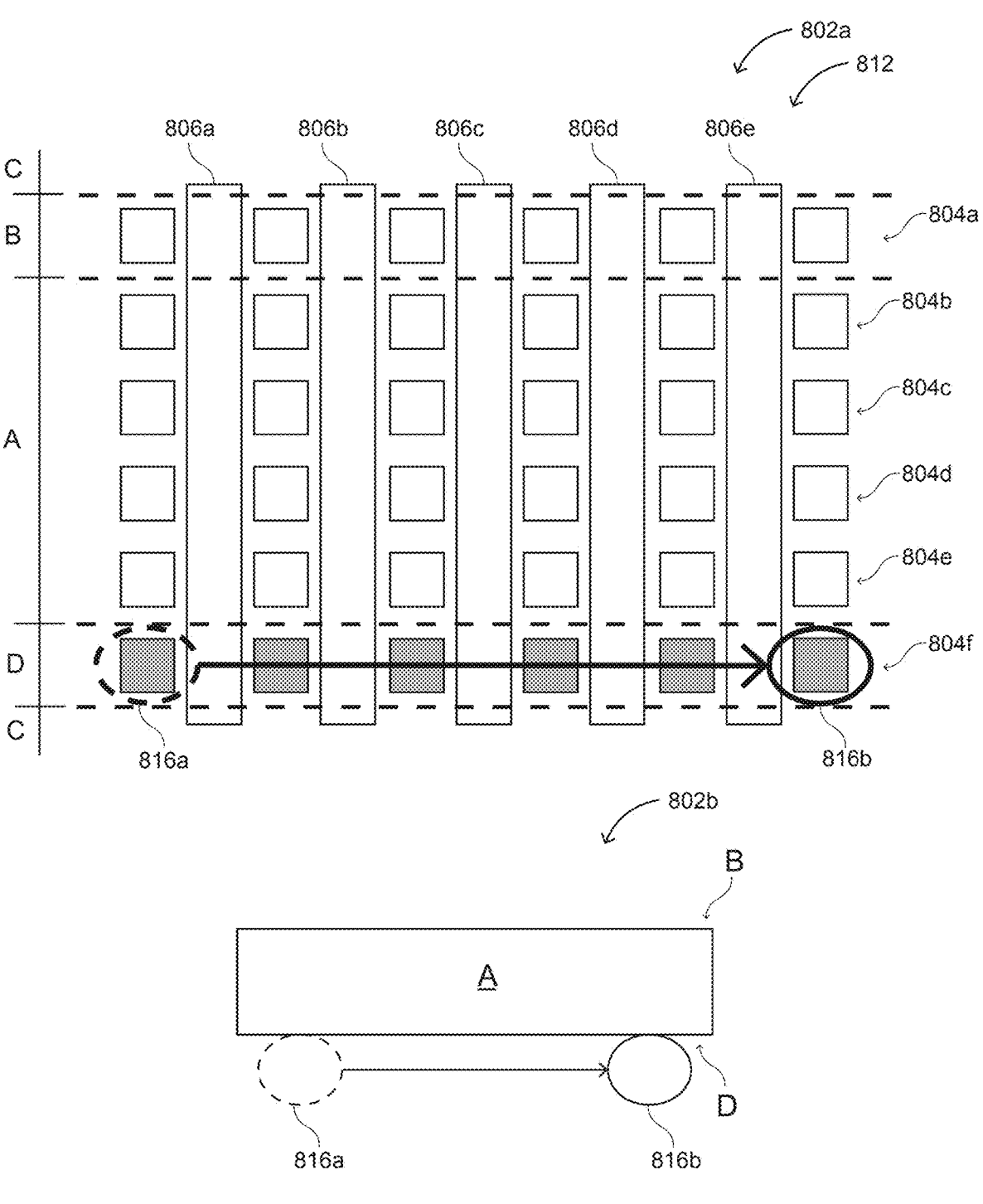

In FIG. 8C, electronic device 802a detects a touch gesture on surface D. For example, as shown in FIG. 8C, the gesture includes contact and movement of an object (e.g., a finger or stylus) from a first position 816a to a second position 816b. In some examples, the touch-sensing circuitry of electronic device 802a detects the contact from signals received (e.g., via one or more sense channels) from touch electrode 804f (e.g., the contact saturates the electrode segments of touch electrode 804f, as represented by the shaded fill pattern of the electrode segments of touch electrode 804f in FIG. 8C). For example, detecting the contact of the object includes driving one or more elongated electrodes 806a-806e with a stimulation signal while touch electrode 804f is sensed. In some examples, in response to detecting the contact on surface D, electronic device 802a performs a corresponding operation (e.g., the touch processor executes one or more instructions stored in a memory to cause electronic device 802a to perform the operation). In some examples, the operation performed by electronic device 802a in FIG. 8C (in response to the contact on surface D) is different from the operation performed by electronic device 802a in FIG. 8A and/or 8B (in response to contact on surface A or B). In some examples, electronic device 802a performs a different operation from the operation performed in FIG. 8C in response to detecting a different type of contact on surface D (e.g., in response to detecting a tap input).

Figure 8D:
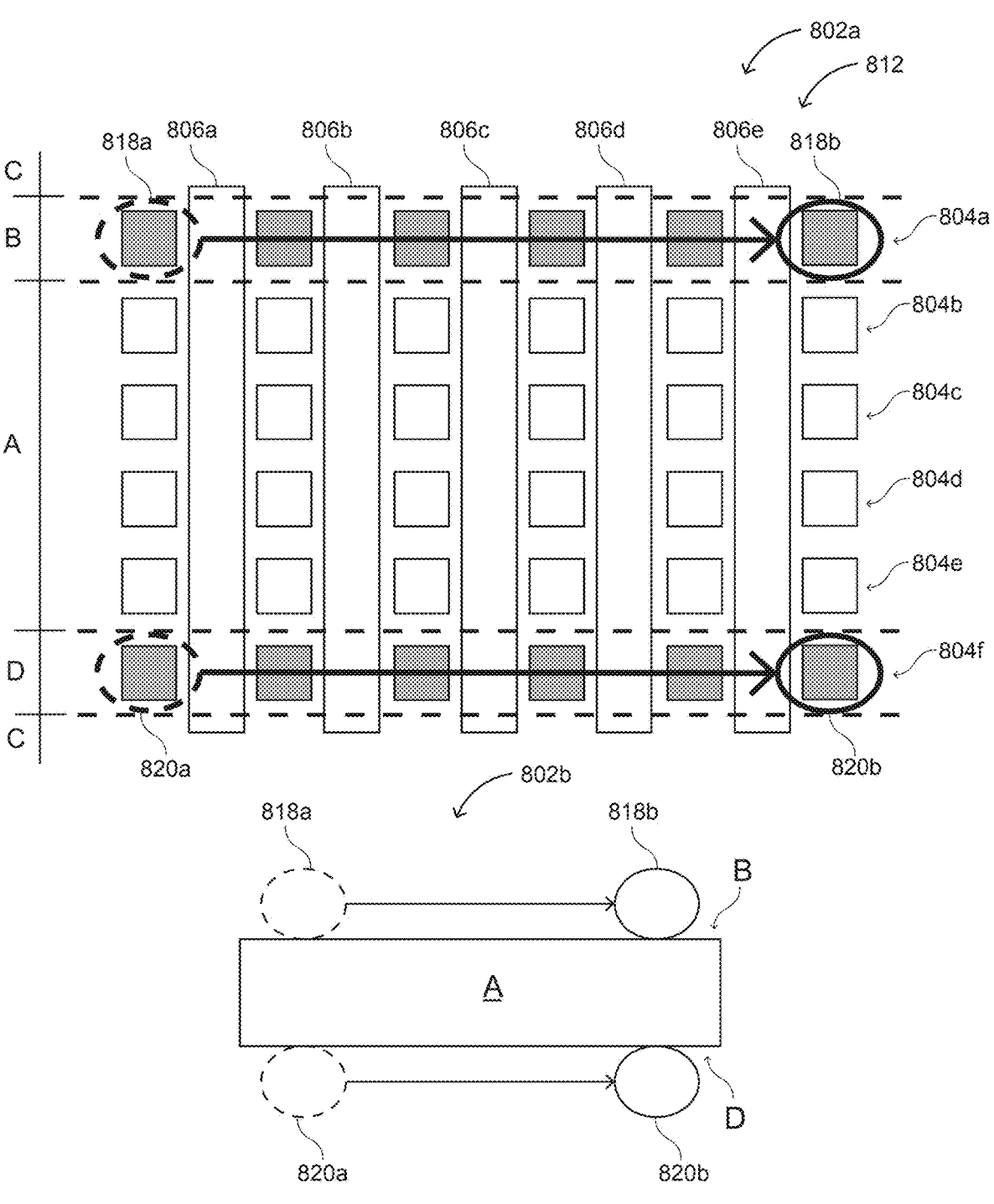

In FIG. 8D, electronic device 802a detects a touch gesture that includes a pair of opposite contacts on surface B and surface D. For example, the pair of opposite contacts correspond to a pinch gesture (e.g., surface B is a top surface of electronic device 802a, and surface D is a bottom surface of electronic device 802a). In some examples, the pinch gesture also includes movement. For example, the gesture includes concurrent movement of a first object (e.g., a first finger) from first position 818a to second position 818b on surface B and a second object (e.g., a second finger) from first position 820a to second position 820b on surface D. In some examples, the touch-sensing circuitry of electronic device 802a detects the pair of contacts from signals received (e.g., via one or more sense channels) from touch electrodes 804a and 804f (e.g., the contact saturates the electrode segments of touch electrodes 804a and 804f, as represented by the shaded fill pattern of the electrode segments of touch electrodes 804a and 804f in FIG. 8D). For example, detecting the pair of contacts of the objects includes driving one or more elongated electrodes 806a-806e with a stimulation signal while touch electrodes 804a and 804e are sensed. In some examples, in response to detecting the pair of contacts on surface B and surface D, electronic device 802a performs a corresponding operation (e.g., the touch processor executes one or more instructions stored in a memory to cause electronic device 802a to perform the operation). In some examples, the operation performed by electronic device 802a in FIG. 8D (in response to the pair of contacts detected on surfaces B and D) is different from the operations performed by electronic device 802a in FIGS. 8A, 8B, and/or 8C (in response to a single contact on surface A, B, or D). In some examples, electronic device 802a performs a different operation from the operation performed in FIG. 8D in response to detecting a different type of multi-touch contact on surfaces B and D. For example, electronic device 802a performs a different operation from the operation performed in FIG. 8D in response to a pinch-tap input (e.g., a pinch of surface B and D that does not include movement of an object relative to surface B and/or D).

Therefore, according to the above, some examples of the disclosure are directed to an electronic device comprising a housing comprising a first surface, a second surface, and a third surface, wherein the second surface is disposed between and non-parallel to the first surface and the third surface. In some examples, the electronic device further comprises a plurality of first sense electrode segments disposed on the first surface, wherein one or more first sense electrode segments of the plurality of first sense electrode segments are coupled to form one or more first sense electrodes on the first surface. In some examples, the electronic device further comprises a plurality of second sense electrode segments disposed on the second surface, wherein one or more second sense electrode segments of the plurality of second sense electrode segments are coupled to form one or more second sense electrodes on the second surface. In some examples, the electronic device further comprises a plurality of drive electrodes including one or more drive electrodes that separate one or more pairs of first sense electrode segments of the plurality of first sense electrode segments and that separate one or more pairs of second sense electrode segments of the plurality of second sense electrode segments, wherein at least a first drive electrode of the one or more drive electrodes is disposed on the first surface, the second surface, and the third surface.

Additionally, or alternatively, in some examples, a second sense electrode segment of the plurality of second sense electrode segments disposed on the second surface is further disposed on the first surface and the third surface.

Additionally, or alternatively, in some examples, the housing comprises a fourth surface disposed between and non-parallel to the first surface and the third surface, wherein the fourth surface is disposed opposite from the second surface, and the electronic device further comprises a plurality of third sense electrode segments disposed on the fourth surface, wherein one or more third sense electrode segments of the plurality of third sense electrode segments are coupled to form one or more third sense electrodes on the fourth surface.

Additionally, or alternatively, in some examples, the one or more drive electrodes of the plurality of drive electrodes separate one or more pairs of third sense electrodes segments of the plurality of third sense electrode segments, and the at least the first drive electrode is further disposed on the fourth surface.

Additionally, or alternatively, in some examples, a third sense electrode segment of the plurality of third sense electrode segments disposed on the fourth surface is further disposed on the first surface and the third surface.

Additionally, or alternatively, in some examples, the electronic device further comprises touch-sensing circuitry coupled to the one or more first sense electrodes and the one or more second sense electrodes, wherein the electronic device is configured to detect contact on the first surface and the second surface using the touch-sensing circuitry.

Additionally, or alternatively, in some examples, the touch-sensing circuitry is further coupled to one or more third sense electrodes disposed on a fourth surface, opposite the second surface, and the electronic device is further configured to detect contact on the fourth surface using the touch-sensing circuitry.

Additionally, or alternatively, in some examples, the electronic device is further configured to detect an input including a pair of corresponding contacts on the second surface and the fourth surface.

Additionally, or alternatively, in some examples, the one or more first sense electrodes and the one or more second sense electrodes operate as mutual capacitance sense electrodes.

Additionally, or alternatively, in some examples, the one or more first sense electrodes and the one or more second sense electrodes operate as self-capacitance sense electrodes.

Additionally, or alternatively, in some examples, the first surface and the third surface have a width of less than 15 mm and the second surface have a width of less than 5 mm.

Additionally, or alternatively, in some examples, the first surface, the second surface, and the third surface have a length that is less than 150 mm.

According to the above, some examples of the disclosure are directed to a touch sensor panel comprising a first section, a second section, and a third section, wherein the second section is disposed between and non-parallel to the first section and the third section. In some examples, the touch sensor panel further comprises a plurality of first sense electrode segments disposed in the first section, wherein one or more first sense electrode segments of the plurality of first sense electrode segments are coupled to form one or more first sense electrodes in the first section. In some examples, the touch sensor panel further comprises a plurality of second sense electrode segments disposed in the second section, wherein one or more second sense electrode segments of the plurality of second sense electrode segments are coupled to form one or more second sense electrodes on the second section. In some examples, the touch sensor panel further comprises a plurality of drive electrodes including one or more drive electrodes that separate one or more pairs of first sense electrode segments of the plurality of first sense electrode segments and that separate one or more pairs of second sense electrode segments of the plurality of second sense electrode segments, wherein at least a first drive electrode of the plurality of drive electrodes is disposed in the first section, the second section, and the third section.

Additionally, or alternatively, in some examples, a second sense electrode segment of the plurality of second sense electrode segments disposed in the second section is further disposed in the first section and the third section.

Additionally, or alternatively, in some examples, the touch sensor panel further comprises a fourth section disposed between and non-parallel to the first section and the third section, wherein the fourth section is disposed opposite from the second section, and a plurality of third sense electrode segments disposed in the fourth section, wherein one or more third sense electrode segments of the plurality of third sense electrode segments are coupled to form one or more third sense electrodes on the fourth section.

Additionally, or alternatively, in some examples, the one or more drive electrodes of the plurality of drive electrodes separate one or more pairs of third sense electrode segments of the plurality of third sense electrode segments, and the at least the first drive electrode is further disposed in the fourth section.

Additionally, or alternatively, in some examples, the one or more first sense electrodes and the one or more second sense electrodes operate as mutual capacitance sense electrodes.

Additionally, or alternatively, in some examples, the one or more first sense electrodes and the one or more second sense electrodes operate as self-capacitance sense electrodes.

Additionally, or alternatively, in some examples, the first section and the third section include a width of less than 15 mm and the second section includes a width of less than 5 mm.

Additionally, or alternatively, in some examples, the first section, the second section, and the third section include a length that is less than 150 mm.

According to the above, some examples of the disclosure are directed to an electronic device comprising a housing comprising a first surface, a second surface, and a third surface, wherein the second surface is disposed between and non-parallel to the first surface and the third surface. In some examples, the electronic device further comprises a plurality of first sense electrodes disposed on the first surface. In some examples, the electronic device further comprises a plurality of second sense electrodes disposed on the second surface. In some examples, the electronic device further comprises a plurality of third sense electrodes disposed on the third surface. In some examples, the electronic device further comprises touch-sensing circuitry coupled to the plurality of first sense electrodes, the plurality of second sense electrodes, and the plurality of third sense electrodes, wherein the electronic device is configured to detect contact on the first surface, the second surface, and the third surface using self-capacitance measurements by the touch-sensing circuitry.

According to the above, some examples of the disclosure are directed to an electronic device comprising a housing comprising a first surface, a second surface, and a third surface, wherein the second surface is disposed between and non-parallel to the first surface and the third surface. In some examples, the electronic device further comprises a plurality of first sense electrode segments disposed on the first surface, wherein one or more first sense electrode segments of the plurality of first sense electrode segments are coupled to form one or more first sense electrodes on the first surface. In some examples, the electronic device further comprises a plurality of second sense electrode segments disposed on the second surface, wherein one or more second sense electrode segments of the plurality of second sense electrode segments are coupled to form one or more second sense electrodes on the second surface. In some examples, the electronic device further comprises a plurality of third sense electrodes including one or more third sense electrodes that separate one or more pairs of first sense electrode segments of the plurality of first sense electrode segments and that separate one or more pairs of second sense electrode segments of the plurality of second sense electrode segments, wherein at least one of the third sense electrodes of the plurality of third sense electrodes is disposed on the first surface, the second surface, and the third surface.

The invention claimed is:

1. An electronic device comprising:
a housing comprising a first surface, a second surface, and a third surface, wherein the second surface is disposed between and non-parallel to the first surface and the third surface;
a plurality of first sense electrode segments disposed on the first surface, wherein each of the plurality of first sense electrode segments comprises a first plate of conductive material, and wherein respective first sense electrode segments of the plurality of first sense electrode segments are coupled using first routing to form one or more first sense electrodes on the first surface;
a plurality of second sense electrode segments disposed on the second surface, wherein each of the plurality of second sense electrode segments comprises a second plate of conductive material, and wherein respective second sense electrode segments of the plurality of second sense electrode segments are coupled using second routing to form one or more second sense electrodes on the second surface; and
a plurality of drive electrodes including one or more drive electrodes that separate one or more pairs of first sense electrode segments of the plurality of first sense electrode segments and that separate one or more pairs of second sense electrode segments of the plurality of second sense electrode segments, wherein at least a first drive electrode of the one or more drive electrodes is disposed on the first surface, the second surface, and the third surface.

2. The electronic device of claim 1, wherein a second sense electrode segment of the plurality of second sense electrode segments disposed on the second surface is further disposed on the first surface and the third surface.

3. The electronic device of claim 1, wherein the housing comprises a fourth surface disposed between and non-parallel to the first surface and the third surface, wherein the fourth surface is disposed opposite from the second surface, the electronic device further comprising:
a plurality of third sense electrode segments disposed on the fourth surface, wherein one or more third sense electrode segments of the plurality of third sense electrode segments are coupled to form one or more third sense electrodes on the fourth surface.

4. The electronic device of claim 3, wherein the one or more drive electrodes of the plurality of drive electrodes separate one or more pairs of third sense electrodes segments of the plurality of third sense electrode segments, and the at least the first drive electrode is further disposed on the fourth surface.

5. The electronic device of claim 3, wherein a third sense electrode segment of the plurality of third sense electrode segments disposed on the fourth surface is further disposed on the first surface and the third surface.

6. The electronic device of claim 1, further comprising:
touch-sensing circuitry coupled to the one or more first sense electrodes and the one or more second sense electrodes, wherein the electronic device is configured to detect contact on the first surface and the second surface using the touch-sensing circuitry.

7. The electronic device of claim 6, wherein the touch-sensing circuitry is further coupled to one or more third sense electrodes disposed on a fourth surface, opposite the second surface, and the electronic device is further configured to detect contact on the fourth surface using the touch-sensing circuitry.

8. The electronic device of claim 7, wherein the electronic device is further configured to detect an input including a pair of corresponding contacts on the second surface and the fourth surface.

9. The electronic device of claim 1, wherein the one or more first sense electrodes and the one or more second sense electrodes operate as mutual capacitance sense electrodes.

10. The electronic device of claim 1, wherein the one or more first sense electrodes and the one or more second sense electrodes operate as self-capacitance sense electrodes.

11. The electronic device of claim 1, wherein the first surface and the third surface have a width of less than 15 mm and the second surface have a width of less than 5 mm.

12. The electronic device of claim 1, wherein the first surface, the second surface, and the third surface have a length that is less than 150 mm.

13. A touch sensor panel, comprising:
a first section, a second section, and a third section, wherein the second section is disposed between and non-parallel to the first section and the third section;
a plurality of first sense electrode segments disposed in the first section, wherein each of the plurality of first sense electrode segments comprises a first plate of conductive material, and wherein respective first sense electrode segments of the plurality of first sense electrode segments are coupled using first routing to form one or more first sense electrodes in the first section;
a plurality of second sense electrode segments disposed in the second section, wherein each of the plurality of second sense electrode segments comprises a second plate of conductive material, and wherein respective second sense electrode segments of the plurality of second sense electrode segments are coupled using second routing to form one or more second sense electrodes on the second section; and
a plurality of drive electrodes including one or more drive electrodes that separate one or more pairs of first sense electrode segments of the plurality of first sense electrode segments and that separate one or more pairs of second sense electrode segments of the plurality of second sense electrode segments, wherein at least a first drive electrode of the plurality of drive electrodes is disposed in the first section, the second section, and the third section.

14. The touch sensor panel of claim 13, wherein a second sense electrode segment of the plurality of second sense electrode segments disposed in the second section is further disposed in the first section and the third section.

15. The touch sensor panel of claim 13, further comprising:
a fourth section disposed between and non-parallel to the first section and the third section, wherein the fourth section is disposed opposite from the second section; and
a plurality of third sense electrode segments disposed in the fourth section, wherein one or more third sense electrode segments of the plurality of third sense electrode segments are coupled to form one or more third sense electrodes on the fourth section.

16. The touch sensor panel of claim 15, wherein the one or more drive electrodes of the plurality of drive electrodes separate one or more pairs of third sense electrode segments of the plurality of third sense electrode segments, and the at least the first drive electrode is further disposed in the fourth section.

17. The touch sensor panel of claim 13, wherein the one or more first sense electrodes and the one or more second sense electrodes operate as mutual capacitance sense electrodes.

18. The touch sensor panel of claim 13, wherein the one or more first sense electrodes and the one or more second sense electrodes operate as self-capacitance sense electrodes.

19. The touch sensor panel of claim 13, wherein the first section and the third section include a width of less than 15 mm and the second section includes a width of less than 5 mm.

20. The touch sensor panel of claim 13, wherein the first section, the second section, and the third section include a length that is less than 150 mm.

* * * * *